United States Patent
Liu et al.

(10) Patent No.: US 10,805,909 B2
(45) Date of Patent: Oct. 13, 2020

(54) CONTROL SIGNALING TRANSMISSION METHOD AND APPARATUS

(71) Applicant: HUAWEI TECHNOLOGIES CO., LTD., Shenzhen, Guangdong (CN)

(72) Inventors: Jin Liu, Shenzhen (CN); Ye Wu, Shanghai (CN); Xiaoyan Bi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 127 days.

(21) Appl. No.: 15/939,009

(22) Filed: Mar. 28, 2018

(65) Prior Publication Data

US 2018/0220409 A1    Aug. 2, 2018

Related U.S. Application Data

(63) Continuation of application No. PCT/CN2016/100000, filed on Sep. 24, 2016.

(30) Foreign Application Priority Data

Sep. 29, 2015   (CN) .......................... 2015 1 0633497
Apr. 12, 2016   (CN) .......................... 2016 1 0224688

(51) Int. Cl.
*H04W 72/04*    (2009.01)
*H04L 5/00*     (2006.01)
*H04W 72/12*    (2009.01)

(52) U.S. Cl.
CPC ....... *H04W 72/0406* (2013.01); *H04L 5/0023* (2013.01); *H04L 5/0037* (2013.01);
(Continued)

(58) Field of Classification Search
CPC ......... H04W 72/0406; H04W 72/1278; H04W 72/044; H04L 5/0048; H04L 5/0091; H04L 5/0053; H04L 5/0037; H04L 5/0023
See application file for complete search history.

(56) References Cited

U.S. PATENT DOCUMENTS

2008/0153425 A1*  6/2008  Heo ...................... H04L 5/0055
                                                    455/68
2009/0303969 A1   12/2009  Lee et al.
(Continued)

FOREIGN PATENT DOCUMENTS

CN          101222260 A       7/2008
CN          101730241 A       6/2010
(Continued)

*Primary Examiner* — Lan-Huong Truong
(74) *Attorney, Agent, or Firm* — Womble Bond Dickinson (US) LLP

(57) ABSTRACT

Embodiments of the present disclosure describe a control signaling reception method and apparatus. The method includes: receiving to-be-received control signaling using a control channel, wherein the control signaling carried on the control channel indicates operation of at least two terminal devices; and demodulating the to-be-received control signaling; wherein the control channel occupies a part of subcarriers in a system bandwidth in a frequency domain. According to the embodiments of the present disclosure, common control signaling that can indicate operation of multiple terminal devices and user dedicated control signaling that can indicate an operation behavior of only one terminal device are carried on different physical channels for transmission. In this way, different resource mapping manners and different signal processing manners can be used according to different transmission requirements, so as to optimally balance resource overheads and transmission reli- (Continued)

ability of different types of control signaling, thereby improving transmission resource use efficiency.

20 Claims, 7 Drawing Sheets

(52) U.S. Cl.
CPC .......... *H04L 5/0048* (2013.01); *H04L 5/0053* (2013.01); *H04L 5/0091* (2013.01); *H04W 72/044* (2013.01); *H04W 72/1278* (2013.01)

(56) References Cited

U.S. PATENT DOCUMENTS

| | | | |
|---|---|---|---|
| 2010/0034165 A1* | 2/2010 | Han | H04L 5/023 370/330 |
| 2010/0067445 A1 | 3/2010 | Rinne et al. | |
| 2010/0238870 A1* | 9/2010 | Mitra | H04L 5/0055 370/329 |
| 2011/0158152 A1 | 6/2011 | Lu et al. | |
| 2012/0106372 A1* | 5/2012 | Gaal | H04B 1/7097 370/252 |
| 2012/0300718 A1* | 11/2012 | Ji | H04L 5/0053 370/329 |
| 2013/0170406 A1* | 7/2013 | Kishiyama | H04L 1/0026 370/280 |
| 2014/0241234 A1 | 8/2014 | Zhu et al. | |
| 2017/0041948 A1* | 2/2017 | Cheng | H04L 5/0051 |

FOREIGN PATENT DOCUMENTS

| | | |
|---|---|---|
| CN | 101809929 A | 8/2010 |
| CN | 103096379 A | 5/2013 |

\* cited by examiner

100

| Carry to-be-transmitted control signaling by using a control channel, where the control signaling carried on the control channel can indicate operation behaviors of at least two terminal devices | ~ S110 |

| Transmit the to-be-transmitted control signaling on the control channel | ~ S120 |

Receive to-be-received control signaling by using a control channel, where the control signaling carried on the control channel can indicate operation behaviors of at least two terminal devices — S210

Demodulate the to-be-received control signaling — S220

CONTROL SIGNALING TRANSMISSION METHOD AND APPARATUS

CROSS-REFERENCE TO RELATED APPLICATION

This application is a continuation of International Application No. PCT/CN2016/100000, filed on Sep. 24, 2016, which claims priority to Chinese Patent Application No. 201610224688.0, filed on Apr. 12, 2016, and also claims priority to Chinese Patent Application No. 201510633497.5, filed on Sep. 29, 2015. The disclosures of the aforementioned applications are hereby incorporated by reference in their entireties.

TECHNICAL FIELD

The present disclosure relates to the communications field, and more specifically, to a control signaling transmission method and apparatus.

BACKGROUND

The massive multiple-input multiple-output (Massive MIMO) technology is one of key technologies for a future 5G mobile communications system. In the massive MIMO technology, massive cheap active antenna components with low power consumption and low precision are used to serve a limited quantity of users. Although a transmit power of each antenna port is low, massive antenna ports cooperatively work to make full use of a spatial feature and to focus radiation energy on a small spatial area, that is, steer to a user using a relatively narrow radiation beam, so as to greatly improve a throughput and energy use efficiency.

In a full-bandwidth control channel design solution of an existing 4G Long Term Evolution (LTE) system/LTE-Advanced (LTE-A) system, one resource mapping manner and one transmission solution are used for downlink control information facing a specified user and downlink control information facing multiple users. To ensure that a cell edge user can perform accurate reception, a resource mapping manner and transmission solution with relatively high redundancy are used, and this affects resource usage of downlink control information facing a single user. Therefore, it is necessary to provide a new control signaling transmission method.

SUMMARY

Embodiments of the present disclosure provides a control signaling transmission method and apparatus, so as to optimally balance resource overheads and transmission reliability of different types of control signaling, thereby improving transmission resource use efficiency.

According to a first aspect, a control signaling transmission method is provided, including: carrying to-be-transmitted control signaling using a control channel, where the control signaling carried on the control channel can indicate operation of at least two terminal devices; and transmitting the to-be-transmitted control signaling on the control channel.

With reference to the first aspect, in a first embodiment of the first aspect, the control signaling carried on the control channel can be used to indicate a time-frequency resource location and/or a transmission format of control information that can be read by the at least two terminal devices.

With reference to the first aspect or the first embodiment of the first aspect, in a second embodiment of the first aspect, the to-be-transmitted control signaling is control signaling scrambled using one or more of the following identifiers that can be used by the at least two terminal devices: a system information-radio network temporary identifier SI-RNTI, a random access-radio network temporary identifier RA-RNTI, or a paging-radio network temporary identifier P-RNTI.

With reference to the first aspect, or the first or the second embodiment of the first aspect, in a third embodiment of the first aspect, the transmitting the to-be-transmitted control signaling on the control channel includes: transmitting the to-be-transmitted control signaling using at least one control channel element CCE on the control channel.

With reference to the third embodiment of the first aspect, in a fourth embodiment of the first aspect, the control channel occupies M subcarriers in a system bandwidth in a frequency domain, and M is a positive integer less than a total quantity of subcarriers included by the system bandwidth.

With reference to the fourth embodiment of the first aspect, in a fifth embodiment of the first aspect, the M subcarriers are located in the middle of the system bandwidth.

With reference to the fourth or the fifth embodiment of the first aspect, in a sixth embodiment of the first aspect, a value of M is 72.

With reference to any one of the fourth to the sixth embodiments of the first aspect, in a seventh embodiment of the first aspect, the control channel and at least one of a data channel or a user dedicated control channel occupy a frequency domain resource using frequency division multiplexing.

With reference to any one of the fourth to the seventh embodiments of the first aspect, in an eighth embodiment of the first aspect, the control channel occupies N symbols of one subframe in a time domain, and N is a positive integer less than a total quantity of symbols included by the subframe.

With reference to the eighth embodiment of the first aspect, in a ninth embodiment of the first aspect, a time-frequency resource corresponding to the M subcarriers and the N symbols in the subframe includes T time-frequency resource subsets, and when the at least one CCE includes multiple CCEs, at least two of the multiple CCEs occupy different time-frequency resource subsets of the T time-frequency resource subsets, where M and N are positive integers greater than or equal to 1, and T is a positive integer greater than or equal to 2.

With reference to the eighth embodiment of the first aspect, in a tenth embodiment of the first aspect, a time-frequency resource corresponding to the M subcarriers and the N symbols in the subframe includes T time-frequency resource subsets, and the at least one CCE occupies a same time-frequency resource subset in the T time-frequency resource subsets, where M, N, and T are positive integers greater than or equal to 1.

With reference to any one of the first aspect, or the first to the tenth embodiments of the first aspect, in an eleventh embodiment of the first aspect, a precoding scheme used for the control channel is different from a precoding scheme used for the data channel.

With reference to any one of the first aspect, or the first to the tenth embodiments of the first aspect, in a twelfth embodiment of the first aspect, a precoding scheme used for the control channel is different from a precoding scheme used for the user dedicated control channel.

With reference to the eleventh embodiment of the first aspect, in a thirteenth embodiment of the first aspect, transmit power allocation for the control channel is prior to transmit power allocation for the data channel.

With reference to the twelfth embodiment of the first aspect, in a fourteenth embodiment of the first aspect, transmit power allocation for the control channel is prior to transmit power allocation for the user dedicated control channel.

With reference to any one of the first aspect, or the first to the fourteenth embodiments of the first aspect, in a fifteenth embodiment of the first aspect, when the selected M subcarriers cannot carry all of the common control signaling, other M0 subcarriers may be selected as a second control channel. In this case, the M subcarriers carry a part of the common control signaling and resource parameters of the second control channel (including one or more of parameters such as a value of M0, a quantity of selected antenna ports used for transmission on the second control channel, pilot information, a time-frequency resource quantity, a time-frequency resource mapping manner of the second control channel, a period, a subframe number, a timeslot number, a subcarrier number, a frequency band number, and power information). It can be learnt from FIG. 4a that the value of M0 may change dynamically. Both a transmit density and period of the M0 subcarriers may be different from those of the M subcarriers. This can effectively control system overheads. The M0 subcarriers of the second control channel and the M subcarriers may be or may not be adjacent in a frequency domain, and may be or may not be transmitted simultaneously in a time domain.

With reference to any one of the first aspect, or the first to the fifteenth embodiments of the first aspect, in a sixteenth embodiment of the first aspect, the M subcarriers are distributed discretely or distributed centrally in the system bandwidth, and the distribution manner of the M subcarriers may change dynamically.

With reference to any one of the first aspect, or the first to the sixteenth embodiments of the first aspect, in a seventeenth embodiment of the first aspect, parameters of the control channel are preset, and the parameters include one or more of: a quantity of subcarriers occupied by the control channel, a quantity of selected antenna ports on the control channel that are used for transmission, pilot information, a time-frequency resource quantity, a time-frequency resource mapping manner of the control channel, a period, a subframe number, a timeslot number, a subcarrier number, a frequency band number, or power information.

With reference to any one of the first aspect, or the first to the seventeenth embodiments of the first aspect, in an eighteenth embodiment of the first aspect, a cell-specific reference signal may occupy a same frequency band as the control channel, and does not need to occupy the entire system bandwidth. That is, the cell-specific reference signal is carried on the control channel.

With reference to any one of the first aspect, or the first to the eighteenth embodiments of the first aspect, in a nineteenth embodiment of the first aspect, the control signaling may be transmitted using some antenna ports selected from antenna ports configured for a base station.

According to a second aspect, a control signaling transmission method is provided, including: receiving to-be-received control signaling using a control channel, where the control signaling carried on the control channel can indicate operation of at least two terminal devices; and demodulating the to-be-received control signaling.

With reference to the second aspect, in a first embodiment of the second aspect, the control signaling carried on the control channel can be used to indicate a time-frequency resource location and/or a transmission format of control information that can be read by the at least two terminal devices.

With reference to the second aspect or the first embodiment of the second aspect, in a second embodiment of the second aspect, the to-be-received control signaling is control signaling scrambled using one or more of the following identifiers that can be used by the at least two terminal devices: a system information-radio network temporary identifier SI-RNTI, a random access-radio network temporary identifier RA-RNTI, or a paging-radio network temporary identifier P-RNTI.

With reference to the second aspect, or the first or the second embodiment of the second aspect, in a third embodiment of the second aspect, the receiving to-be-received control signaling using a control channel includes: receiving the to-be-received control signaling using at least one control channel element CCE on the control channel.

With reference to the third embodiment of the second aspect, in a fourth embodiment of the second aspect, the control channel occupies M subcarriers in a system bandwidth in a frequency domain, and M is a positive integer less than a total quantity of subcarriers included by the system bandwidth.

With reference to the fourth embodiment of the second aspect, in a fifth embodiment of the second aspect, the M subcarriers are located in the middle of the system bandwidth.

With reference to the fourth or the fifth embodiment of the second aspect, in a sixth embodiment of the second aspect, a value of M is 72.

With reference to any one of the fourth to the sixth embodiments of the second aspect, in a seventh embodiment of the second aspect, the control channel and at least one of a data channel or a user dedicated control channel occupy a frequency domain resource using frequency division multiplexing.

With reference to any one of the fourth to the seventh embodiments of the second aspect, in an eighth embodiment of the second aspect, the control channel occupies N symbols of one subframe in a time domain, and N is a positive integer less than a total quantity of symbols included by the subframe.

With reference to the eighth embodiment of the second aspect, in a ninth embodiment of the second aspect, a time-frequency resource corresponding to the M subcarriers and the N symbols in the subframe includes T time-frequency resource subsets, and when the at least one CCE includes multiple CCEs, at least two of the multiple CCEs occupy different time-frequency resource subsets of the T time-frequency resource subsets, where M and N are positive integers greater than or equal to 1, and T is a positive integer greater than or equal to 2.

With reference to the eighth embodiment of the second aspect, in a tenth embodiment of the second aspect, a time-frequency resource corresponding to the M subcarriers and the N symbols in the subframe includes T time-frequency resource subsets, and the at least one CCE occupies a same time-frequency resource subset in the T time-frequency resource subsets, where M, N, and T are positive integers greater than or equal to 1.

With reference to any one of the second aspect, or the first to the tenth embodiments of the second aspect, in an eleventh embodiment of the second aspect, a precoding scheme used for the control channel is different from a precoding scheme used for the data channel.

With reference to any one of the second aspect, or the first to the tenth embodiments of the second aspect, in a twelfth embodiment of the second aspect, a precoding scheme used for the control channel is different from a precoding scheme used for the user dedicated control channel.

With reference to the eleventh embodiment of the second aspect, in a thirteenth embodiment of the second aspect, transmit power allocation for the control channel is prior to transmit power allocation for the data channel.

With reference to the twelfth embodiment of the second aspect, in a fourteenth embodiment of the second aspect, transmit power allocation for the control channel is prior to transmit power allocation for the user dedicated control channel.

With reference to any one of the second aspect, or the first to the fourteenth embodiments of the second aspect, in a fifteenth embodiment of the second aspect, when the selected M subcarriers cannot carry all of the common control signaling, other M0 subcarriers are selected as a second control channel. In this case, the M subcarriers carry a part of the common control signaling and resource parameters of the second control channel (including one or more of parameters such as a value of M0, a quantity of selected antenna ports used for transmission on the second control channel, pilot information, a time-frequency resource quantity, a time-frequency resource mapping manner of the second control channel, a period, a subframe number, a timeslot number, a subcarrier number, a frequency band number, and power information). It can be learnt from FIG. 4a that the value of M0 may change dynamically. Both a transmit density and period of the M0 subcarriers may be different from those of the M subcarriers. This can effectively control system overheads. The M0 subcarriers of the second control channel and the M subcarriers may be or may not be adjacent in a frequency domain, and may be or may not be transmitted simultaneously in a time domain.

With reference to any one of the second aspect, or the first to the fifteenth embodiments of the second aspect, in a sixteenth embodiment of the second aspect, the M subcarriers are distributed discretely or distributed centrally in the system bandwidth, and the distribution manner of the M subcarriers may change dynamically.

With reference to any one of the second aspect, or the first to the sixteenth embodiments of the second aspect, in a seventeenth embodiment of the second aspect, parameters of the control channel are preset, and the parameters include one or more of: a quantity of subcarriers occupied by the control channel, a quantity of selected antenna ports on the control channel that are used for transmission, pilot information, a time-frequency resource quantity, a time-frequency resource mapping manner of the control channel, a period, a subframe number, a timeslot number, a subcarrier number, a frequency band number, or power information.

With reference to any one of the second aspect, or the first to the seventeenth embodiments of the second aspect, in an eighteenth embodiment of the second aspect, a cell-specific reference signal may occupy a same frequency band as the control channel, and does not need occupy the entire system bandwidth. That is, the cell-specific reference signal is carried on the control channel.

According to a third aspect, a control signaling transmission apparatus is provided, including: a processing module, configured to carry to-be-transmitted control signaling using a control channel, where the control signaling carried on the control channel can indicate operation of at least two terminal devices; and a transmission module, configured to transmit the to-be-transmitted control signaling on the control channel.

With reference to the third aspect, in a first embodiment of the third aspect, the control signaling carried on the control channel can be used to indicate a time-frequency resource location and/or a transmission format of control information that can be read by the at least two terminal devices.

With reference to the third aspect or the first embodiment of the third aspect, in a second embodiment of the third aspect, the to-be-transmitted control signaling is control signaling scrambled using one or more of the following identifiers that can be used by the at least two terminal devices: a system information-radio network temporary identifier SI-RNTI, a random access-radio network temporary identifier RA-RNTI, or a paging-radio network temporary identifier P-RNTI.

With reference to the third aspect, or the first or the second embodiment of the third aspect, in a third embodiment of the third aspect, the transmission module is specifically configured to transmit the to-be-transmitted control signaling using at least one control channel element CCE on the control channel.

With reference to the third embodiment of the third aspect, in a fourth embodiment of the third aspect, the control channel occupies M subcarriers in a system bandwidth in a frequency domain, and M is a positive integer less than a total quantity of subcarriers included by the system bandwidth.

With reference to the fourth embodiment of the third aspect, in a fifth embodiment of the third aspect, the M subcarriers are located in the middle of the system bandwidth.

With reference to the fourth or the fifth embodiment of the third aspect, in a sixth embodiment of the third aspect, a value of M is 72.

With reference to any one of the fourth to the sixth embodiments of the third aspect, in a seventh embodiment of the third aspect, the control channel and at least one of a data channel or a user dedicated control channel occupy a frequency domain resource using frequency division multiplexing.

With reference to any one of the fourth to the seventh embodiments of the third aspect, in an eighth embodiment of the third aspect, the control channel occupies N symbols of one subframe in a time domain, and N is a positive integer less than a total quantity of symbols included by the subframe.

With reference to the eighth embodiment of the third aspect, in a ninth embodiment of the third aspect, a time-frequency resource corresponding to the M subcarriers and the N symbols in the subframe includes T time-frequency resource subsets, and when the at least one CCE includes multiple CCEs, at least two of the multiple CCEs occupy different time-frequency resource subsets of the T time-frequency resource subsets, where M and N are positive integers greater than or equal to 1, and T is a positive integer greater than or equal to 2.

With reference to the eighth embodiment of the third aspect, in a tenth embodiment of the third aspect, a time-frequency resource corresponding to the M subcarriers and the N symbols in the subframe includes T time-frequency resource subsets, and the at least one CCE occupies a same time-frequency resource subset in the T time-frequency resource subsets, where M, N, and T are positive integers greater than or equal to 1.

With reference to any one of the third aspect, or the first to the tenth embodiments of the third aspect, in an eleventh embodiment of the third aspect, a precoding scheme used for the control channel is different from a precoding scheme used for the data channel.

With reference to any one of the third aspect, or the first to the tenth embodiments of the third aspect, in a twelfth embodiment of the third aspect, a precoding scheme used for the control channel is different from a precoding scheme used for the user dedicated control channel.

With reference to the eleventh embodiment of the third aspect, in a thirteenth embodiment of the third aspect, transmit power allocation for the control channel is prior to transmit power allocation for the data channel.

With reference to the twelfth embodiment of the third aspect, in a fourteenth embodiment of the third aspect, transmit power allocation for the control channel is prior to transmit power allocation for the user dedicated control channel.

With reference to any one of the third aspect, or the first to the fourteenth embodiments of the third aspect, in a fifteenth embodiment of the third aspect, the apparatus is a network device.

With reference to any one of the third aspect, or the first to the fifteenth embodiments of the third aspect, in a sixteenth embodiment of the third aspect, the transmission module is further configured to perform transmission on a second control channel. When the selected M subcarriers cannot carry all of the common control signaling, other M0 subcarriers are selected as the second control channel. In this case, the M subcarriers carry a part of the common control signaling and resource parameters of the second control channel (including one or more of parameters such as a value of M0, a quantity of selected antenna ports used for transmission on the second control channel, pilot information, a time-frequency resource quantity, a time-frequency resource mapping manner of the second control channel, a period, a subframe number, a timeslot number, a subcarrier number, a frequency band number, and power information). It can be learnt from FIG. 4a that the value of M0 may change dynamically. Both a transmit density and period of the M0 subcarriers may be different from those of the M subcarriers. This can effectively control system overheads. The M0 subcarriers of the second control channel and the M subcarriers may be or may not be adjacent in a frequency domain, and may be or may not be transmitted simultaneously in a time domain.

With reference to any one of the third aspect, or the first to the sixteenth embodiments of the third aspect, in a seventeenth embodiment of the third aspect, the M subcarriers are distributed discretely or distributed centrally in the system bandwidth, and the distribution manner of the M subcarriers may change dynamically.

With reference to any one of the third aspect, or the first to the seventeenth embodiments of the third aspect, in an eighteenth embodiment of the third aspect, the processing module is further configured to select some antenna ports from antenna ports configured for a base station, to transmit the control signaling.

With reference to any one of the third aspect, or the first to the eighteenth embodiments of the third aspect, in a nineteenth embodiment of the third aspect, parameters of the control channel are preset, and the parameters include one or more of: a quantity of subcarriers occupied by the control channel, a quantity of selected antenna ports on the control channel that are used for transmission, pilot information, a time-frequency resource quantity, a time-frequency resource mapping manner of the control channel, a period, a subframe number, a timeslot number, a subcarrier number, a frequency band number, or power information.

With reference to any one of the third aspect, or the first to the nineteenth embodiments of the third aspect, in a twentieth embodiment of the third aspect, a cell-specific reference signal may occupy a same frequency band as the control channel, and does not need occupy the entire system bandwidth. That is, the cell-specific reference signal is carried on the control channel.

According to a fourth aspect, a control signaling transmission apparatus is provided, including: a receiving module, configured to receive to-be-received control signaling using a control channel, where the control signaling carried on the control channel can indicate operation of at least two terminal devices; and a processing module, configured to demodulate the to-be-received control signaling.

With reference to the fourth aspect, in a first embodiment of the fourth aspect, the control signaling carried on the control channel can be used to indicate a time-frequency resource location and/or a transmission format of control information that can be read by the at least two terminal devices.

With reference to the fourth aspect or the first embodiment of the fourth aspect, in a second embodiment of the fourth aspect, the to-be-received control signaling is control signaling scrambled using one or more of the following identifiers that can be used by the at least two terminal devices: a system information-radio network temporary identifier SI-RNTI, a random access-radio network temporary identifier RA-RNTI, or a paging-radio network temporary identifier P-RNTI.

With reference to the fourth aspect, or the first or the second embodiment of the fourth aspect, in a third embodiment of the fourth aspect, the receiving module is specifically configured to receive the to-be-received control signaling using at least one control channel element CCE on the control channel.

With reference to the third embodiment of the fourth aspect, in a fourth embodiment of the fourth aspect, the control channel occupies M subcarriers in a system bandwidth in a frequency domain, and M is a positive integer less than a total quantity of subcarriers included by the system bandwidth.

With reference to the fourth embodiment of the fourth aspect, in a fifth embodiment of the fourth aspect, the M subcarriers are located in the middle of the system bandwidth.

With reference to the fourth or the fifth embodiment of the fourth aspect, in a sixth embodiment of the fourth aspect, a value of M is 72.

With reference to any one of the fourth to the sixth embodiments of the fourth aspect, in a seventh embodiment of the fourth aspect, the control channel and at least one of a data channel or a user dedicated control channel occupy a frequency domain resource using frequency division multiplexing.

With reference to any one of the fourth to the seventh embodiments of the fourth aspect, in an eighth embodiment of the fourth aspect, the control channel occupies N symbols of one subframe in a time domain, and N is a positive integer less than a total quantity of symbols included by the subframe.

With reference to the eighth embodiment of the fourth aspect, in a ninth embodiment of the fourth aspect, a time-frequency resource corresponding to the M subcarriers and the N symbols in the subframe includes T time-frequency resource subsets, and when the at least one CCE includes multiple CCEs, at least two of the multiple CCEs occupy different time-frequency resource subsets of the T time-frequency resource subsets, where M and N are positive integers greater than or equal to 1, and T is a positive integer greater than or equal to 2.

With reference to the eighth embodiment of the fourth aspect, in a tenth embodiment of the fourth aspect, a time-frequency resource corresponding to the M subcarriers and the N symbols in the subframe includes T time-frequency resource subsets, and the at least one CCE occupies a same time-frequency resource subset in the T time-frequency resource subsets, where M, N, and T are positive integers greater than or equal to 1.

With reference to any one of the fourth aspect, or the first to the tenth embodiments of the fourth aspect, in an eleventh embodiment of the fourth aspect, a precoding scheme used for the control channel is different from a precoding scheme used for the data channel.

With reference to any one of the fourth aspect, or the first to the tenth embodiments of the fourth aspect, in a twelfth embodiment of the fourth aspect, a precoding scheme used for the control channel is different from a precoding scheme used for the user dedicated control channel.

With reference to the eleventh embodiment of the fourth aspect, in a thirteenth embodiment of the fourth aspect, transmit power allocation for the control channel is prior to transmit power allocation for the data channel.

With reference to the twelfth embodiment of the fourth aspect, in a fourteenth embodiment of the fourth aspect, transmit power allocation for the control channel is prior to transmit power allocation for the user dedicated control channel.

With reference to any one of the fourth aspect, or the first to the fourteenth embodiments of the fourth aspect, in a fifteenth embodiment of the fourth aspect, the apparatus is a terminal device.

With reference to any one of the fourth aspect, or the first to the fifteenth embodiments of the fourth aspect, in a sixteenth embodiment of the fourth aspect, the apparatus further receives a second control channel. When the selected M subcarriers cannot carry all of the common control signaling, other M0 subcarriers are selected as the second control channel. In this case, the M subcarriers carry a part of the common control signaling and resource parameters of the second control channel (including one or more of parameters such as a value of M0, a quantity of selected antenna ports used for transmission on the second control channel, pilot information, a time-frequency resource quantity, a time-frequency resource mapping manner of the second control channel, a period, a subframe number, a timeslot number, a subcarrier number, a frequency band number, and power information). It can be learnt from FIG. 4a that the value of M0 may change dynamically. Both a transmit density and period of the M0 subcarriers may be different from those of the M subcarriers. This can effectively control system overheads. The M0 subcarriers of the second control channel and the M subcarriers may be or may not be adjacent in a frequency domain, and may be or may not be transmitted simultaneously in a time domain.

With reference to any one of the fourth aspect, or the first to the sixteenth embodiments of the fourth aspect, in a seventeenth embodiment of the fourth aspect, the M subcarriers are distributed discretely or distributed centrally in the system bandwidth, and the distribution manner of the M subcarriers may change dynamically.

With reference to any one of the fourth aspect, or the first to the seventeenth embodiments of the fourth aspect, in an eighteenth embodiment of the fourth aspect, parameters of the control channel are preset, and the parameters include one or more of: a quantity of subcarriers occupied by the control channel, a quantity of selected antenna ports on the control channel that are used for transmission, pilot information, a time-frequency resource quantity, a time-frequency resource mapping manner of the control channel, a period, a subframe number, a timeslot number, a subcarrier number, a frequency band number, or power information.

With reference to any one of the fourth aspect, or the first to the eighteenth embodiments of the fourth aspect, in a nineteenth embodiment of the fourth aspect, a cell-specific reference signal may occupy a same frequency band as the control channel, and does not need occupy the entire system bandwidth. That is, the cell-specific reference signal is carried on the control channel.

Based on the foregoing technical features, according to the control signaling transmission method and apparatus that are provided by embodiments of the present disclosure, common control signaling that can indicate operation of multiple terminal devices and user dedicated control signaling that can indicate an operation behavior of only one terminal device are carried on different physical channels for transmission. In this way, different resource mapping manners and different signal processing manners can be used according to different transmission requirements, so as to optimally balance resource overheads and transmission reliability of different types of control signaling, thereby improving transmission resource use efficiency.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show only some embodiments of the present disclosure, and a person of ordinary skill in the art may still derive other drawings from these accompanying drawings without creative efforts.

FIG. 1 is a schematic flowchart of a control signaling transmission method according to an embodiment of the present disclosure;

DESCRIPTION OF EMBODIMENTS

Figure 2:
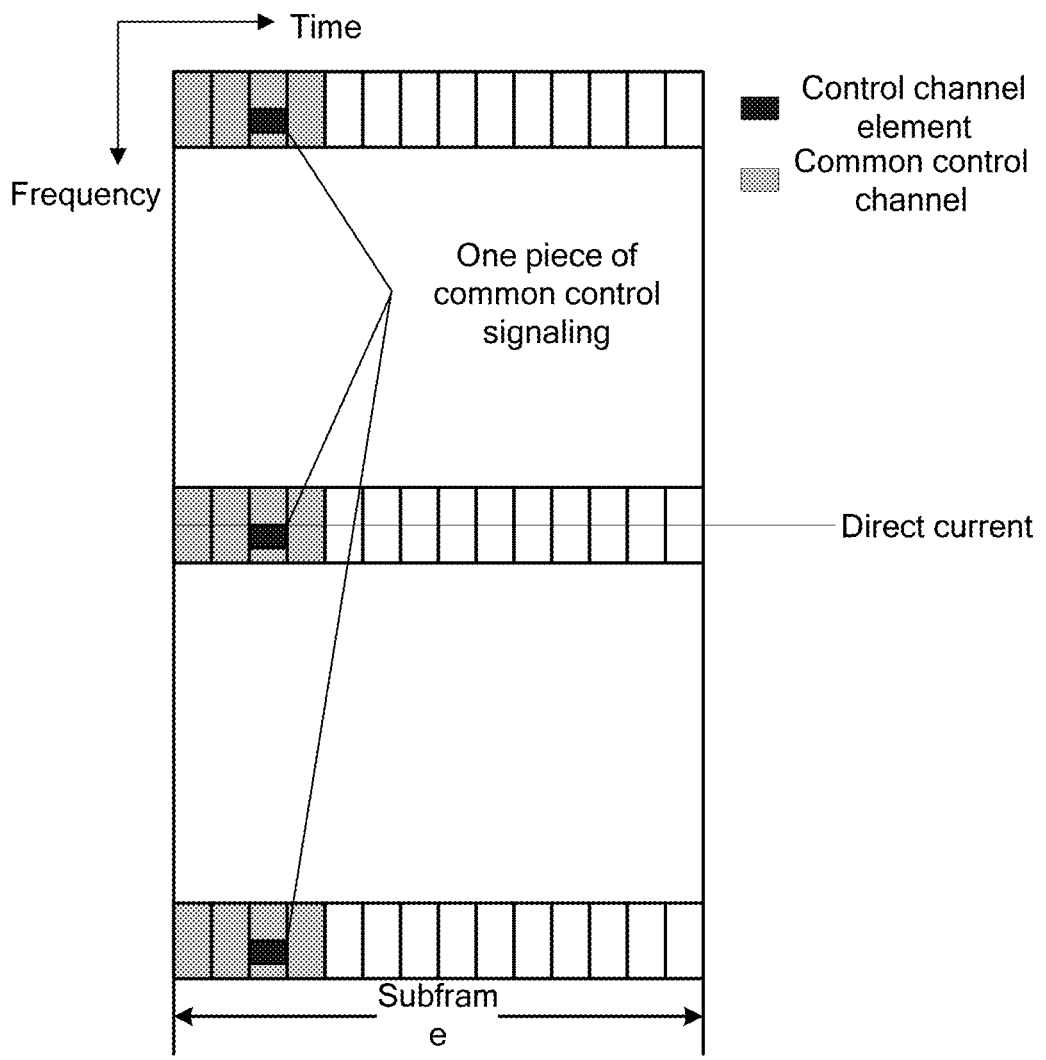
FIG. 2 is a schematic diagram of a control signaling carrying manner according to an embodiment of the present disclosure.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

It should be understood that, the technical solutions of the embodiments of the present disclosure may be applied to various communications systems, such as: a Global System for Mobile Communications (GSM), a Code Division Multiple Access (CDMA) system, a Wideband Code Division Multiple Access (WCDMA) system, a Long Term Evolution (LTE) system, an LTE frequency division duplex (FDD) system, an LTE time division duplex (TDD), a Universal Mobile Telecommunications System (UMTS), and a future 5G communications system.

It should be understood that in the embodiments of the present disclosure, a terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a wireless local area network (WLAN), or may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, or a terminal device in a future 5G network.

A network device may be a device used by the network device and the like to communicate with a mobile device. The network device may be an access point (AP) in a WLAN, a base transceiver station (BTS) in GSM or CDMA, a NodeB (NB) in WCDMA, or an evolved NodeB (eNB or eNodeB), a relay station, an in-vehicle device, or a wearable device in Long Term Evolution (LTE), or a network device in a future 5G network.

It should be noted that methods of the embodiments of the present disclosure may be applied to a massive MIMO system, or may be applied to a system with limited antenna ports. The present disclosure is based on an existing scenario in which a design solution of a physical broadcast channel (PBCH) remains unchanged, and may also be applied to another scenario in which a physical channel changes.

FIG. 1 is a schematic flowchart of a control signaling transmission method according to an embodiment of the present disclosure. The method may be executed by a network device. As shown in FIG. 1, the method 100 includes:

S110: Carry to-be-transmitted control signaling using a control channel, where the control signaling carried on the control channel can indicate operation of at least two terminal devices.

S120: Transmit the to-be-transmitted control signaling on the control channel.

Specifically, after carrying the to-be-transmitted control signaling using the control channel, the network device transmits the to-be-transmitted control signaling on the control channel. The control signaling carried on the control channel can indicate operation of at least two terminal devices.

Therefore, according to the control signaling transmission method in this embodiment of the present disclosure, common control signaling that can indicate operation of multiple terminal devices and user dedicated control signaling that can indicate an operation behavior of only one terminal device are carried on different physical channels for transmission. In this way, different resource mapping manners and different signal processing manners can be used according to different transmission requirements, so as to optimally balance resource overheads and transmission reliability of different types of control signaling, thereby improving transmission resource use efficiency.

Still further, in a massive MIMO system, massive cheap active antenna components with low power consumption and low precision are used to serve a limited quantity of users. Therefore, an energy-converged narrow beam needs to be used to steer to a user to obtain relatively high spectrum utilization and energy use efficiency. In the massive MIMO system, control signaling transmission efficiency can be effectively improved using the control signaling transmission method in this embodiment of the present disclosure.

In this embodiment of the present disclosure, optionally, the control signaling that can indicate the operation (Behavior) of the at least two terminal devices may be referred to as common control signaling. Control information that can be read by the at least two terminal devices may be understood as control information that can be notified to the at least two terminal devices. The control information that can be notified to the at least two terminal devices may be referred to as common control information. The control channel in S110 may be referred to as a common control channel, but the protection scope of the present disclosure is not limited to this name.

Optionally, in S110, the control signaling carried on the control channel can be used to indicate a time-frequency resource location and/or a transmission format of the control information that can be read by the at least two terminal devices.

Optionally, in S110, the to-be-transmitted control signaling is control signaling scrambled using one or more of the following identifiers that can be used by the at least two terminal devices: a system information-radio network temporary identifier SI-RNTI, a random access-radio network temporary identifier RA-RNTI, or a paging-radio network temporary identifier P-RNTI.

For example, the common control signaling may be DCI format 1A scrambled using a system information-radio network temporary identifier (SI-RNTI), DCI format 1C scrambled using a paging-radio network temporary identifier P-RNTI, or physical downlink shared channel (PDSCH) signaling scrambled using a random access-radio network temporary identifier RA-RNTI in an existing communications standard. However, the present disclosure is not limited thereto.

Specifically, a system information block (SIB) in an existing 4G LTE/LTE-Advanced system carries broadcasting system information. The broadcasting system information carried on the SIB is a main body of cell system information. Different system information forms different SIBs. These SIBs are transmitted on a physical downlink shared channel (PDSCH). Frequency division multiplexing is performed on the SIBs and unicast data transmitted on the channel. The SIBs are referred to as dynamic broadcast channels (DBCH) on the PDSCH. Locations and transmission formats of the SIBs on the PDSCH in one subframe are indicated by downlink control signaling scrambled using an SI-RNTI. The control signaling carried on the control channel in this embodiment of the present disclosure may include the downlink control signaling scrambled using the SI-RNTI.

Notification-class information in the existing 4G LTE/LTE-Advanced system includes random access response (RAR) information and paging (Paging) information. A location and transmission format of the RAR information transmitted on the PDSCH are indicated by downlink control signaling scrambled using a random access-radio network temporary identifier RA-RNTI, and a location and transmission format of the paging information are indicated by downlink control signaling scrambled using a paging-radio network temporary identifier P-RNTI. The control signaling carried on the control channel in this embodiment of the present disclosure may include the downlink control signaling scrambled using the RA-RNTI and/or the downlink control signaling scrambled using the P-RNTI.

In this embodiment of the present disclosure, optionally, the control information that can be notified to the at least two terminal devices may include the broadcasting system information in the existing LTE system carried by the SIB and the notification-class information in the existing LTE system. The notification-class information may include the random access response information and/or the paging information. However, the present disclosure is not limited thereto.

It should be understood that in this embodiment of the present disclosure, the control signaling carried on the control channel may further include other control signaling that can indicate operation of multiple terminal devices, and no limitation is imposed thereon in the present disclosure.

In this embodiment of the present disclosure, optionally, S120 is specifically: transmitting the to-be-transmitted control signaling using at least one control channel element CCE on the control channel.

For example, as shown in FIG. 2, parts filled with a light color represent time-frequency resources occupied by common control channels. Parts filled with a dark color represent control channel elements (CCE). A common control channel may include multiple CCEs. During control signaling transmission, to-be-transmitted control signaling may be mapped onto the multiple CCEs. For example, in FIG. 2, one piece of common control signaling may be mapped onto three CCEs for transmission.

In addition, the network device may further determine, according to parameters such as a control signaling transmission condition, a cell size, and a control signaling transmission range, a quantity of CCEs and a transmit power that are used during control signaling transmission.

Optionally, in S110, the control channel may occupy an entire system bandwidth in a frequency domain, or may occupy only a part of a system bandwidth. The system bandwidth may be understood as a channel bandwidth in the existing communications standard. For example, an Evolved UMTS Universal Terrestrial Radio Access (E-UTRA) system can support system bandwidths of 1.4 MHz, 3 MHz, 5 MHz, 10 MHz, 15 MHz, 20 MHz, and the like. For example, the control channel occupies M subcarriers in the system bandwidth in a frequency domain. M is any positive integer less than a total quantity of subcarriers corresponding to the system bandwidth. That is, the control channel occupies only a part of the system bandwidth. For example, in FIG. 2, the control channel occupies three bandwidths. Therefore, a transmit power may be preferentially allocated to a frequency band occupied by the control channel, to ensure transmission quality of the common control signaling, and then, the remaining power is allocated to a user dedicated control channel, a data channel, or the like. In other words, when a communications system includes only a control channel and a data channel, transmit power allocation for the control channel is prior to transmit power allocation for the data channel. When a communications system includes only a control channel and a user dedicated control channel, transmit power allocation for the control channel is prior to transmit power allocation for the user dedicated control channel. When a communications system includes a control channel, a data channel, and a user dedicated control channel, transmit power allocation for the control channel is prior to transmit power allocation for the data channel, and transmit power allocation for the control channel is prior to transmit power allocation for the user dedicated control channel. Optionally, the data channel may be a PDSCH in the existing LTE system. However, the present disclosure is not limited thereto.

Figure 3:
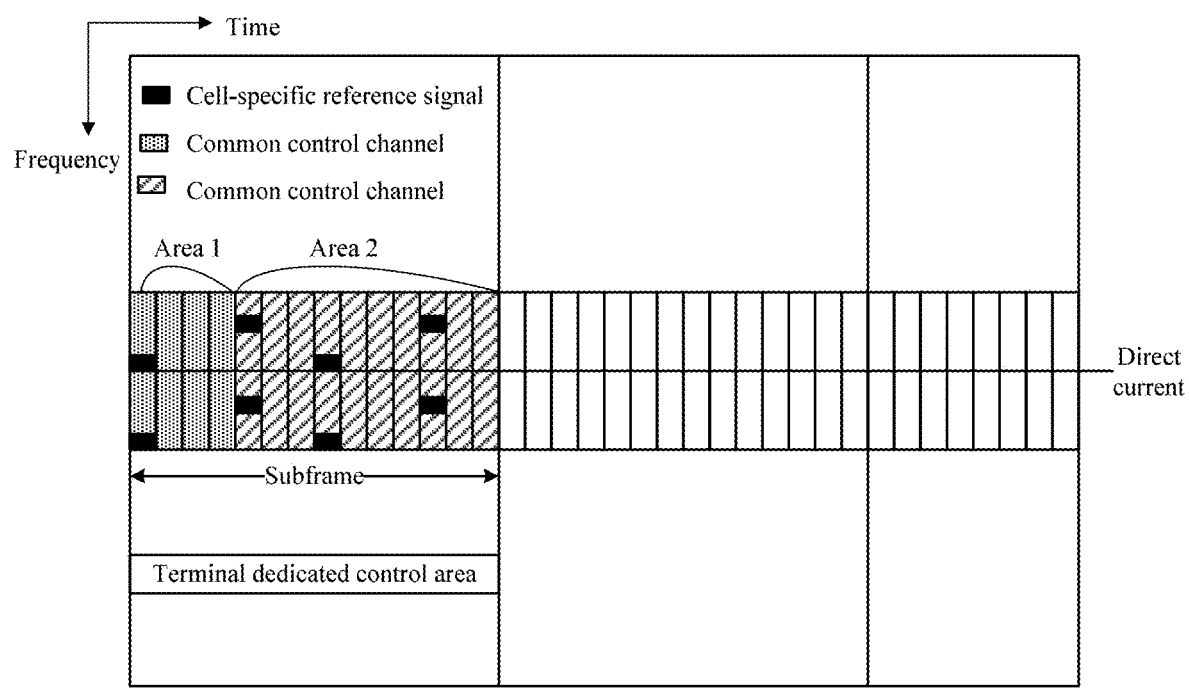
FIG. 3 is a schematic diagram of a resource mapping location of control signaling according to an embodiment of the present disclosure.

Optionally, as shown in FIG. 3, the control channel occupies a middle frequency band of the system bandwidth. In other words, the M subcarriers are located in the middle of the system bandwidth. Therefore, a reference signal whose transmission manner and/or resource overheads is/are the same as that/those on a PBCH can be used on the control channel. In addition, other part of the bandwidth, except a bandwidth occupied by the common control channel, in a subframe can be allocated to a user dedicated control channel and/or a data channel.

In this embodiment of the present disclosure, optionally, as shown in FIG. 3, a cell-specific reference signal (CRS) with high resource overheads and accurately estimated channel information may occupy a same frequency band as the control channel, and does not need occupy the entire system bandwidth. The remaining part of the system bandwidth may be used for a demodulation reference signal (DMRS) with low overheads, so as to effectively reduce system overheads.

Further, as shown in FIG. 3, the central frequency resource in the subframe may be further divided into T time-frequency areas. For example, two areas are obtained through division in FIG. 3. A control channel of a current cell may occupy time-frequency resources in only some of the T time-frequency areas, for example, an area 1. The other time-frequency areas may be allocated to other different cells or sectors. For example, a time-frequency resource in an area 2 is allocated to a neighboring cell #1. A physical control format indicator channel (PCFICH) is used to indicate a time-frequency area allocated to a cell or sector. In this way, inter-cell interference coordination can be implemented.

Figure 4:
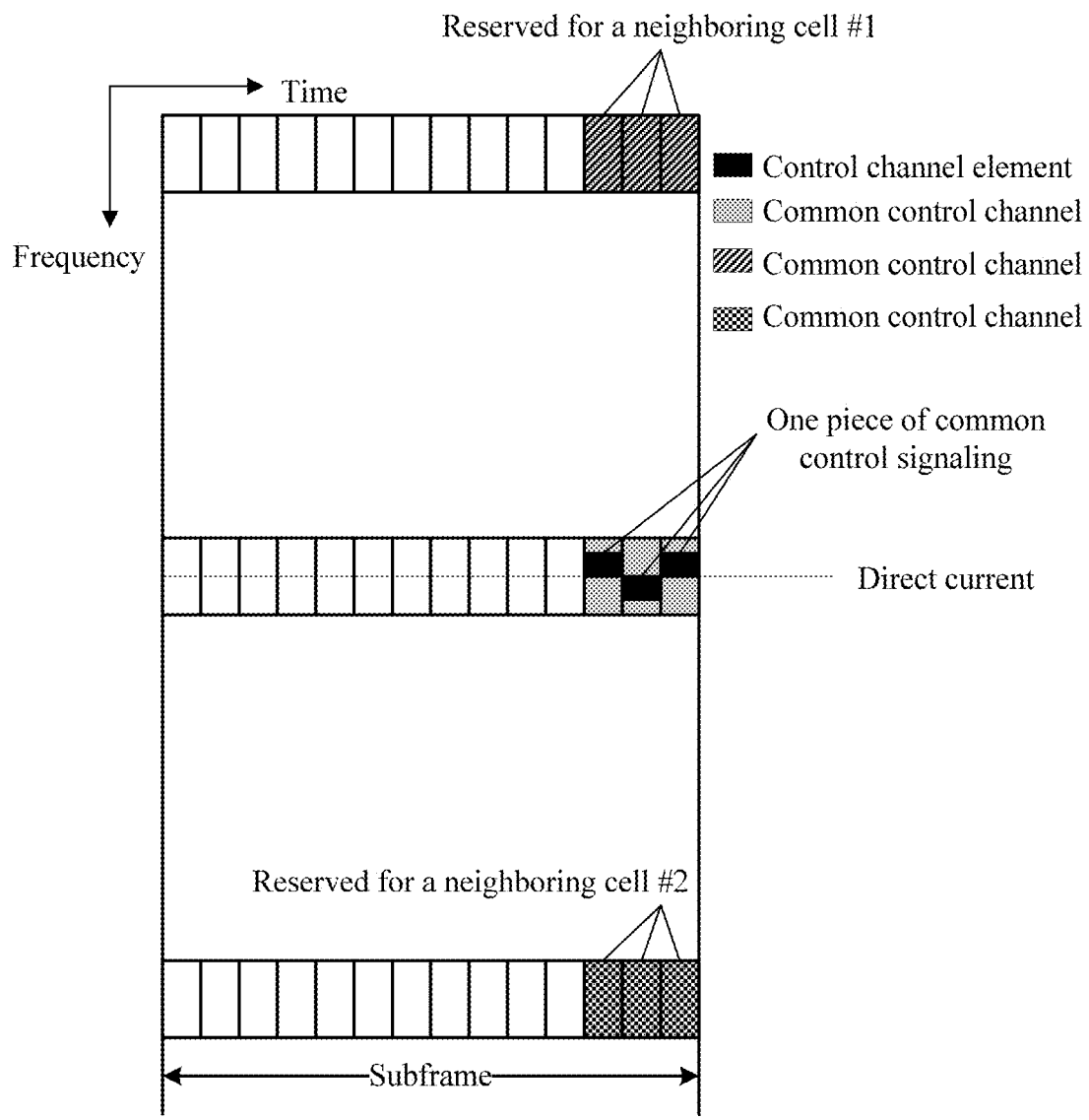
FIG. 4 is a schematic diagram of a time-frequency resource occupied by a control channel according to an embodiment of the present disclosure.

Still further, multiple common control channel elements of one cell may be distributed in T different time-frequency areas scatteredly. Because the multiple common control channel elements are distributed scatteredly, some diversity gains can be obtained. Alternatively, as shown in FIG. 4, multiple common control channel elements of one cell may be concentrated in one time-frequency area, and the multiple common control channel elements and a common control channel of a neighboring cell are distributed in different time-frequency areas, so as to avoid interference of common control channels between adjacent cells.

Preferably, a value of M is 72. Alternatively, the control channel in this embodiment of the present disclosure may occupy a bandwidth of 1.08 MHz in the middle of the system bandwidth. That is, a mapping bandwidth of the control channel is the same as that of the PBCH. Therefore, the PBCH may not include system bandwidth indication information, so as to further reduce overheads of the PBCH.

In this embodiment of the present disclosure, optionally, the control channel and at least one of a data channel or a user dedicated control channel occupy a frequency domain resource using frequency division multiplexing. The data channel is a channel that carries data. The user dedicated control channel is a channel that carries only user dedicated control signaling. Optionally, the data channel may be a prior-art PDSCH. The user dedicated control channel may be a prior-art enhanced physical downlink control channel (ePDCCH). Therefore, precoding gains, frequency-domain scheduling gains, interference coordination gains, and the like may be obtained.

In this embodiment of the present disclosure, optionally, the control channel may occupy all symbols of one subframe in a time domain. Preferably, the control channel occupies N symbols of one subframe in a time domain, and N is any positive integer less than a total quantity of symbols included by the subframe. For example, a control channel of a cell may occupy symbols in a subframe that are numbered 12, 13, and 14. A control channel of another cell may occupy other symbols other than the symbols numbered 12, 13, and 14. Therefore, control signaling interference between adjacent cells can be avoided.

Optionally, a time-frequency resource corresponding to the M subcarriers and the N symbols in the subframe includes T time-frequency resource subsets. When the at least one CCE includes multiple CCEs, at least two of the multiple CCEs occupy different time-frequency resource subsets of the T time-frequency resource subsets, where M and N are positive integers greater than or equal to 1, and T is a positive integer greater than or equal to 2.

In other words, the time-frequency resource that includes the M subcarriers and the N symbols in the subframe may be further divided into the T time-frequency resource subsets, and different CCEs that carry a same piece of control signaling occupy different time-frequency resource subsets, or time-frequency resources of the control channel are distributed in the subframe scatteredly.

Alternatively, a time-frequency resource corresponding to the M subcarriers and the N symbols in the subframe includes T time-frequency resource subsets, and the at least one CCE occupies a same time-frequency resource subset in the T time-frequency resource subsets, where M, N, and T are positive integers greater than or equal to 1.

In other words, the time-frequency resource that includes the M subcarriers and the N symbols in the subframe may be further divided into the T time-frequency resource subsets, and different CCEs that carry a same piece of control signaling occupy one time-frequency resource subset, or the control channel is mapped in the subframe centrally.

In this embodiment of the present disclosure, optionally, a precoding scheme that is the same as or different from that for the data channel may be used for the control channel. Preferably, a precoding scheme used for the control channel is different from a precoding scheme used for the data channel.

In this embodiment of the present disclosure, optionally, a precoding scheme that is the same as or different from that for the user dedicated control channel may be used for the control channel. Preferably, a precoding scheme used for the control channel is different from a precoding scheme used for the user dedicated control channel.

Figures 5, 6:
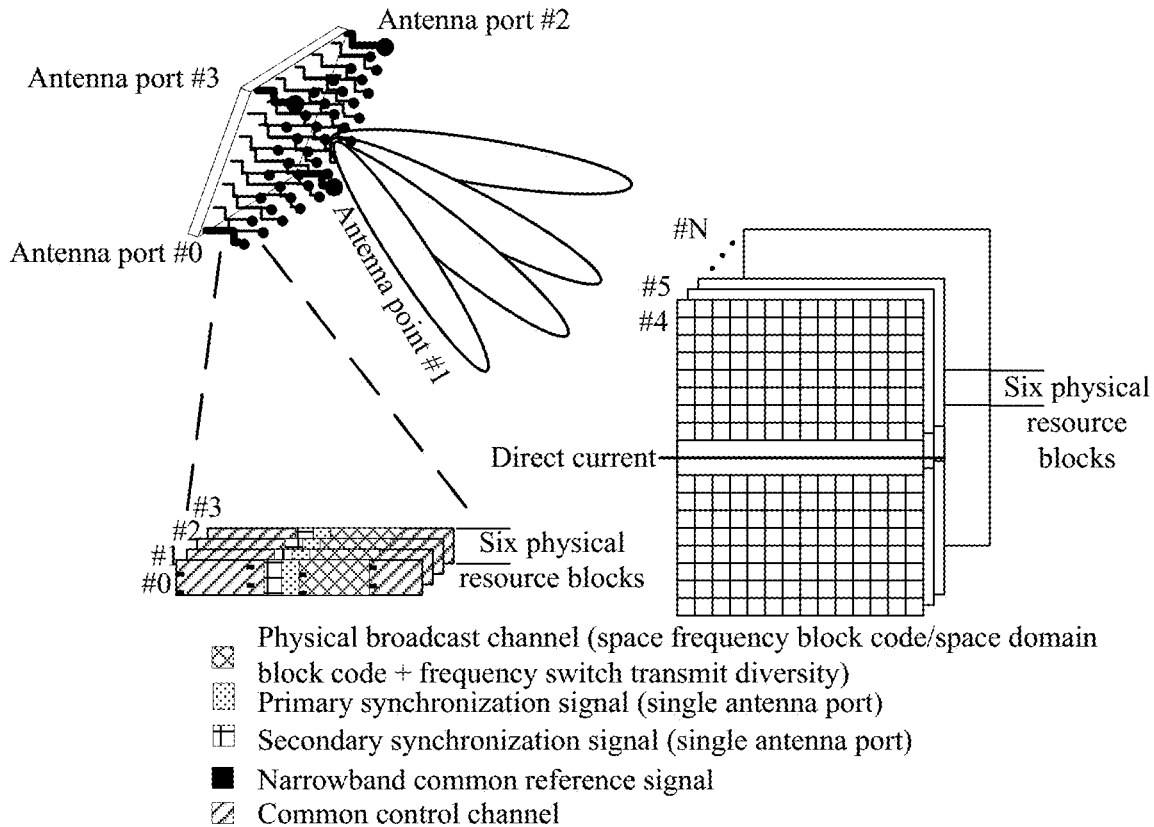
FIG. 5 is a schematic diagram of a control signaling transmission method according to the present disclosure.
FIG. 6 is a schematic diagram of a control signaling transmission method according to another embodiment of the present disclosure.

Specifically, as shown in FIG. 5, multiple antenna ports (AP) transmit control signaling and data to a terminal device. Antenna ports numbered #0 to #3 transmit, in a narrow frequency band using a wide beam, common control signaling that indicates multiple terminal devices. To ensure that the multiple terminal devices successfully receive the control signaling, a precoding scheme for wide-area coverage is used, and all transmit powers are allocated for the control signaling. Antenna ports numbered #4 to # N transmit, in a relatively wide frequency band using a narrow beam, user dedicated control signaling that can indicate only one terminal device or data corresponding to one terminal device. In this case, an ordinary precoding scheme may be used, and a transmit power is preferentially allocated for the user dedicated control signaling and the remaining power is then allocated for the data in a power allocation manner for transmission.

Therefore, according to the control signaling transmission method in this embodiment of the present disclosure, common control signaling that can indicate operation of multiple terminal devices and user dedicated control signaling that can indicate an operation behavior of only one terminal device are carried on different physical channels for transmission. In this way, different resource mapping manners and different signal processing manners can be used according to different transmission requirements, so as to optimally balance resource overheads and transmission reliability of different types of control signaling, thereby improving transmission resource use efficiency.

The foregoing describes in detail, on a network device side, the control signaling transmission method according to this embodiment of the present disclosure with reference to FIG. 1 to FIG. 5. The following is to describe in detail, on a terminal device side, a control signaling transmission method according to an embodiment of the present disclosure with reference to FIG. 6. It should be understood that interaction between a terminal device and a network device, related characteristics, functions, and the like described on the network device side are corresponding to those on the terminal device side. For simplicity, repeated descriptions are properly omitted.

FIG. 6 is a schematic flowchart of a control signaling transmission method according to another embodiment of the present disclosure. The method may be executed by a terminal device. As shown in FIG. 6, the method 200 includes:

S210: Receive to-be-received control signaling using a control channel, where the control signaling carried on the control channel can indicate operation of at least two terminal devices.

S220: Demodulate the to-be-received control signaling.

Specifically, after receiving the to-be-received control signaling using the control channel, the terminal device demodulates the received control signaling. The control signaling that can be carried on the control channel can indicate operation of at least two terminal devices.

Therefore, according to the control signaling transmission method in this embodiment of the present disclosure, common control signaling that can indicate operation of multiple terminal devices and user dedicated control signaling that can indicate an operation behavior of only one terminal device are carried on different physical channels for transmission. In this way, different resource mapping manners and different signal processing manners can be used according to different transmission requirements, so as to optimally balance resource overheads and transmission reliability of different types of control signaling, thereby improving transmission resource use efficiency.

Optionally, in S210, the control signaling carried on the control channel can be used to indicate a time-frequency resource location and/or a transmission format of control information that can be read by the at least two terminal devices.

Optionally, in S210, the to-be-received control signaling is control signaling scrambled using one or more of the following identifiers that can be used by the at least two terminal devices: a system information-radio network temporary identifier SI-RNTI, a random access-radio network temporary identifier RA-RNTI, or a paging-radio network temporary identifier P-RNTI.

Optionally, S210 is specifically: receiving the to-be-received control signaling using at least one control channel element CCE on the control channel.

In this embodiment of the present disclosure, optionally, the control channel occupies M subcarriers in a system bandwidth in a frequency domain, and M is any positive integer less than a total quantity of subcarriers included by the system bandwidth.

Preferably, the M subcarriers are located in the middle of the system bandwidth.

Further, preferably, a value of M is 72.

In this embodiment of the present disclosure, optionally, the control channel and at least one of a data channel or a user dedicated control channel occupy a frequency domain resource using frequency division multiplexing.

In this embodiment of the present disclosure, optionally, the control channel occupies N symbols of one subframe in a time domain, and N is any positive integer less than a total quantity of symbols included by the subframe.

In this embodiment of the present disclosure, optionally, a time-frequency resource corresponding to the M subcarriers and the N symbols in the subframe includes T time-frequency resource subsets, and when the at least one CCE includes multiple CCEs, at least two of the multiple CCEs occupy different time-frequency resource subsets of the T time-frequency resource subsets, where M and N are positive integers greater than or equal to 1, and T is a positive integer greater than or equal to 2.

In this embodiment of the present disclosure, optionally, a time-frequency resource corresponding to the M subcarriers and the N symbols in the subframe includes T time-frequency resource subsets, and the at least one CCE occupies a same time-frequency resource subset in the T time-frequency resource subsets, where M, N, and T are positive integers greater than or equal to 1.

In this embodiment of the present disclosure, optionally, a precoding scheme used for the control channel is different from a precoding scheme used for the data channel.

In this embodiment of the present disclosure, optionally, a precoding scheme used for the control channel is different from a precoding scheme used for the user dedicated control channel.

In this embodiment of the present disclosure, optionally, transmit power allocation for the control channel is prior to transmit power allocation for the data channel.

In this embodiment of the present disclosure, optionally, transmit power allocation for the control channel is prior to transmit power allocation for the user dedicated control channel.

In this embodiment of the present disclosure, optionally, the control channel further carries a cell-specific reference signal.

In this embodiment of the present disclosure, optionally, the M subcarriers are distributed discretely or distributed centrally in the system bandwidth. The distribution manner for the M subcarriers may change dynamically.

In this embodiment of the present disclosure, optionally, parameters of the control channel are preset, and these parameters of the control channel include one or more of: a quantity M of subcarriers occupied by the control channel, a quantity of selected antenna ports on the control channel that are used for transmission, pilot information, a time-frequency resource quantity, a time-frequency resource mapping manner of the control channel, a period, a subframe number, a timeslot number, a subcarrier number, a frequency band number, or power information.

In this embodiment of the present disclosure, optionally, when the selected M subcarriers cannot carry all of the common control signaling, other M0 subcarriers can be selected as a second control channel. The common control signaling is carried on the M subcarriers and the M0 subcarriers. The terminal device receives the common control signaling on the M subcarriers and the M0 subcarriers. In addition, the M subcarriers may carry a part of the common control signaling and resource parameters of the second control channel (including one or more of parameters such as a value of M0, a quantity of selected antenna ports used for transmission on the second control channel, pilot information, a time-frequency resource quantity, a time-frequency resource mapping manner of the second control channel, a period, a subframe number, a timeslot number, a subcarrier number, a frequency band number, and power information). The terminal device may receive the resource parameters of the second control channel on the M subcarriers. It can be learnt from FIG. 4a that the value of M0 may change dynamically. Both a transmit density and period of the M0 subcarriers may be different from those of the M subcarriers. This can effectively control system overheads. The M0 subcarriers of the second control channel and the M subcarriers may be or may not be adjacent in a frequency domain, and may be the same or different in a time domain.

Therefore, according to the control signaling transmission method in this embodiment of the present disclosure, common control signaling that can indicate operation of multiple terminal devices and user dedicated control signaling that can indicate an operation behavior of only one terminal device are carried on different physical channels for transmission. In this way, different resource mapping manners and different signal processing manners can be used according to different transmission requirements, so as to optimally balance resource overheads and transmission reliability of different types of control signaling, thereby improving transmission resource use efficiency.

Figure 7:
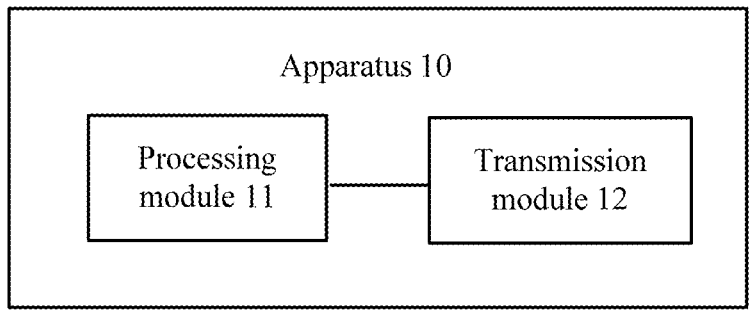
FIG. 7 is a schematic block diagram of a control signaling transmission apparatus according to an embodiment of the present disclosure.

FIG. 7 is a schematic block diagram of a control signaling transmission apparatus according to an embodiment of the present disclosure. As shown in FIG. 7, the apparatus 10 includes:

a processing module 11, configured to carry to-be-transmitted control signaling using a control channel, where the control signaling carried on the control channel can indicate operation of at least two terminal devices; and a transmission module 12, configured to transmit the to-be-transmitted control signaling on the control channel.

Therefore, according to the control signaling transmission apparatus in this embodiment of the present disclosure, common control signaling that can indicate operation of multiple terminal devices and user dedicated control signaling that can indicate an operation behavior of only one terminal device are carried on different physical channels for transmission. In this way, different resource mapping manners and different signal processing manners can be used according to different transmission requirements, so as to optimally balance resource overheads and transmission reliability of different types of control signaling, thereby improving transmission resource use efficiency.

In this embodiment of the present disclosure, optionally, the control signaling carried on the control channel can be used to indicate a time-frequency resource location and/or a transmission format of control information that can be read by the at least two terminal devices.

In this embodiment of the present disclosure, optionally, the to-be-transmitted control signaling is control signaling scrambled using one or more of the following identifiers that can be used by the at least two terminal devices: a system information-radio network temporary identifier SI-RNTI, a random access-radio network temporary identifier RA-RNTI, or a paging-radio network temporary identifier P-RNTI.

In this embodiment of the present disclosure, optionally, the transmission module 12 is specifically configured to transmit the to-be-transmitted control signaling using at least one control channel element CCE on the control channel.

In this embodiment of the present disclosure, optionally, the control channel occupies M subcarriers in a system bandwidth in a frequency domain, and M is any positive integer less than a total quantity of subcarriers included by the system bandwidth.

In this embodiment of the present disclosure, optionally, the M subcarriers are located in the middle of the system bandwidth.

In this embodiment of the present disclosure, optionally, a value of M is 72.

In this embodiment of the present disclosure, optionally, the control channel and at least one of a data channel or a user dedicated control channel occupy a frequency domain resource using frequency division multiplexing.

In this embodiment of the present disclosure, optionally, the control channel occupies N symbols of one subframe in a time domain, and N is any positive integer less than a total quantity of symbols included by the subframe.

In this embodiment of the present disclosure, optionally, a time-frequency resource corresponding to the M subcarriers and the N symbols in the subframe includes T time-frequency resource subsets, and when the at least one CCE includes multiple CCEs, at least two of the multiple CCEs occupy different time-frequency resource subsets of the T time-frequency resource subsets, where M and N are positive integers greater than or equal to 1, and T is a positive integer greater than or equal to 2.

In this embodiment of the present disclosure, optionally, a time-frequency resource corresponding to the M subcarriers and the N symbols in the subframe includes T time-frequency resource subsets, and the at least one CCE occupies a same time-frequency resource subset in the T time-frequency resource subsets, where M, N, and T are positive integers greater than or equal to 1.

In this embodiment of the present disclosure, optionally, a precoding scheme used for the control channel is different from a precoding scheme used for the data channel.

In this embodiment of the present disclosure, optionally, a precoding scheme used for the control channel is different from a precoding scheme used for the user dedicated control channel.

In this embodiment of the present disclosure, optionally, transmit power allocation for the control channel is prior to transmit power allocation for the data channel.

In this embodiment of the present disclosure, optionally, transmit power allocation for the control channel is prior to transmit power allocation for the user dedicated control channel.

In this embodiment of the present disclosure, optionally, the apparatus is a network device.

In this embodiment of the present disclosure, optionally, the processing module is further configured to select some antenna ports from antenna ports configured for a base station, to transmit the control signaling.

In this embodiment of the present disclosure, optionally, a cell-specific reference signal may occupy a same frequency band as the control channel, and does not need occupy the entire system bandwidth. That is, the control channel further carries a cell-specific reference signal.

In this embodiment of the present disclosure, optionally, the M subcarriers are distributed discretely or distributed centrally in the system bandwidth. The distribution manner for the M subcarriers may change dynamically.

In this embodiment of the present disclosure, optionally, parameters of the control channel are preset, and these parameters of the control channel include one or more of: a quantity M of subcarriers occupied by the control channel, a quantity of selected antenna ports on the control channel that are used for transmission, pilot information, a time-frequency resource quantity, a time-frequency resource mapping manner of the control channel, a period, a subframe number, a timeslot number, a subcarrier number, a frequency band number, or power information.

In this embodiment of the present disclosure, optionally, when the selected M subcarriers cannot carry all of the common control signaling, the processing module is further configured to: select other M0 subcarriers as a second control channel, and carry the common control signaling using the M subcarriers and the M0 subcarriers. The transmission module is further configured to transmit the common control signaling on the selected M subcarriers and M0 subcarriers. The M subcarriers may carry a part of the common control signaling and resource parameters of the second control channel (including one or more of parameters such as a value of M0, a quantity of selected antenna ports used for transmission on the second control channel, pilot information, a time-frequency resource quantity, a time-frequency resource mapping manner of the second control channel, a period, a subframe number, a timeslot number, a subcarrier number, a frequency band number, and power information). The processing module is further configured to carry the resource parameters of the second control channel using the M subcarriers. The transmission module is further configured to transmit the resource parameters of the second control channel on the M subcarriers. It can be learnt from FIG. 4a that the value of M0 may change dynamically. Both a transmit density and period of the M0 subcarriers may be different from those of the M subcarriers. This can effectively control system overheads. The M0 subcarriers of the second control channel and the M subcarriers may be or may not be adjacent in a frequency domain, and may be the same or different in a time domain.

It should be understood that the apparatus 10 in this embodiment of the present disclosure may correspondingly execute the control signaling transmission method 100 in the foregoing embodiments of the present disclosure. In addition, the foregoing and other operations and/or functions of all modules of the apparatus 10 are separately used to implement corresponding procedures of the method in FIG. 1. For simplicity, details are not repeated herein.

Therefore, according to the control signaling transmission apparatus in this embodiment of the present disclosure, common control signaling that can indicate operation of multiple terminal devices and user dedicated control signaling that can indicate an operation behavior of only one terminal device are carried on different physical channels for transmission. In this way, different resource mapping manners and different signal processing manners can be used according to different transmission requirements, so as to optimally balance resource overheads and transmission reliability of different types of control signaling, thereby improving transmission resource use efficiency.

Figure 8:
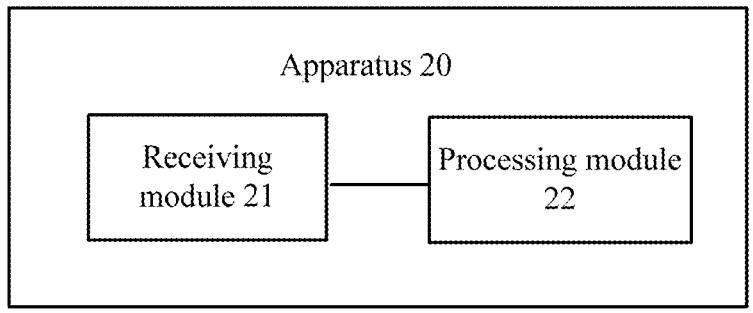
FIG. 8 is a schematic block diagram of a control signaling transmission apparatus according to another embodiment of the present disclosure.

The following is to describe in detail a control signaling transmission apparatus according to another embodiment of the present disclosure with reference to FIG. 8. As shown in FIG. 8, the apparatus 20 includes:

a receiving module 21, configured to receive to-be-received control signaling using a control channel, where the control signaling carried on the control channel can indicate operation of at least two terminal devices; and a processing module 22, configured to demodulate the to-be-received control signaling.

Therefore, according to the control signaling transmission apparatus in this embodiment of the present disclosure, received common control signaling that can indicate operation of multiple terminal devices and received user dedicated control signaling that can indicate an operation behavior of only one terminal device are carried on different physical channels. In this case, in a communication process, a network device can use different resource mapping manners and different signal processing manners according to different transmission requirements, so as to optimally balance resource overheads and transmission reliability of different types of control signaling, thereby improving transmission resource use efficiency.

In this embodiment of the present disclosure, optionally, the control signaling carried on the control channel can be used to indicate a time-frequency resource location and/or a transmission format of control information that can be read by the at least two terminal devices.

In this embodiment of the present disclosure, optionally, the to-be-received control signaling is control signaling scrambled using one or more of the following identifiers that can be used by the at least two terminal devices: a system information-radio network temporary identifier SI-RNTI, a random access-radio network temporary identifier RA-RNTI, or a paging-radio network temporary identifier P-RNTI.

In this embodiment of the present disclosure, optionally, the receiving module 21 is specifically configured to receive the to-be-received control signaling using at least one control channel element CCE on the control channel.

In this embodiment of the present disclosure, optionally, the control channel occupies M subcarriers in a system bandwidth in a frequency domain, and M is any positive integer less than a total quantity of subcarriers included by the system bandwidth.

In this embodiment of the present disclosure, optionally, the M subcarriers are located in the middle of the system bandwidth.

In this embodiment of the present disclosure, optionally, a value of M is 72.

In this embodiment of the present disclosure, optionally, the control channel and at least one of a data channel or a user dedicated control channel occupy a frequency domain resource using frequency division multiplexing.

In this embodiment of the present disclosure, optionally, the control channel occupies N symbols of one subframe in a time domain, and N is any positive integer less than a total quantity of symbols included by the subframe.

In this embodiment of the present disclosure, optionally, a time-frequency resource corresponding to the M subcarriers and the N symbols in the subframe includes T time-frequency resource subsets, and when the at least one CCE includes multiple CCEs, at least two of the multiple CCEs occupy different time-frequency resource subsets of the T time-frequency resource subsets, where M and N are positive integers greater than or equal to 1, and T is a positive integer greater than or equal to 2.

In this embodiment of the present disclosure, optionally, a time-frequency resource corresponding to the M subcarriers and the N symbols in the subframe includes T time-frequency resource subsets, and the at least one CCE occupies a same time-frequency resource subset in the T time-frequency resource subsets, where M, N, and T are positive integers greater than or equal to 1.

In this embodiment of the present disclosure, optionally, a precoding scheme used for the control channel is different from a precoding scheme used for the data channel.

In this embodiment of the present disclosure, optionally, a precoding scheme used for the control channel is different from a precoding scheme used for the user dedicated control channel.

In this embodiment of the present disclosure, optionally, transmit power allocation for the control channel is prior to transmit power allocation for the data channel.

In this embodiment of the present disclosure, optionally, transmit power allocation for the control channel is prior to transmit power allocation for the user dedicated control channel.

In this embodiment of the present disclosure, optionally, the apparatus is a terminal device.

In this embodiment of the present disclosure, optionally, a cell-specific reference signal may occupy a same frequency band as the control channel, and does not need occupy the entire system bandwidth. That is, the control channel further carries a cell-specific reference signal.

In this embodiment of the present disclosure, optionally, the M subcarriers are distributed discretely or distributed centrally in the system bandwidth. The distribution manner for the M subcarriers may change dynamically.

In this embodiment of the present disclosure, optionally, parameters of the control channel are preset, and these parameters of the control channel include one or more of: a quantity M of subcarriers occupied by the control channel, a quantity of selected antenna ports on the control channel that are used for transmission, pilot information, a time-frequency resource quantity, a time-frequency resource mapping manner of the control channel, a period, a subframe number, a timeslot number, a subcarrier number, a frequency band number, or power information.

In this embodiment of the present disclosure, optionally, when the selected M subcarriers cannot carry all of the common control signaling, other M0 subcarriers are selected as a second control channel, and all of the common control signaling is transmitted together on the M subcarriers and the M0 subcarriers. The receiving module 21 is configured to receive the common control signaling on the control channel and the second control channel. The M subcarriers may carry a part of the common control signaling and resource parameters of the second control channel (including one or more of parameters such as a value of M0, a quantity of selected antenna ports used for transmission on the second control channel, pilot information, a time-frequency resource quantity, a time-frequency resource mapping manner of the second control channel, a period, a subframe number, a timeslot number, a subcarrier number, a frequency band number, and power information). The receiving module 21 is further configured to receive the resource parameters of the second control channel on the M subcarriers. It can be learnt from FIG. 4a that the value of M0 may change dynamically. Both a transmit density and period of the M0 subcarriers may be different from those of the M subcarriers. This can effectively control system overheads. The M0 subcarriers of the second control channel and the M subcarriers may be or may not be adjacent in a frequency domain, and may be the same or different in a time domain.

It should be understood that the apparatus 20 in this embodiment of the present disclosure may correspondingly execute the control signaling transmission method 200 in the foregoing embodiment of the present disclosure. In addition, the foregoing and other operations and/or functions of all modules of the apparatus 20 are separately used to implement corresponding procedures of the method in FIG. 6. For simplicity, details are not repeated herein.

Therefore, according to the control signaling transmission apparatus in this embodiment of the present disclosure, received common control signaling that can indicate operation of multiple terminal devices and received user dedicated control signaling that can indicate an operation behavior of only one terminal device are carried on different physical channels. In this case, in a communication process, a network device can use different resource mapping manners and different signal processing manners according to different transmission requirements, so as to optimally balance resource overheads and transmission reliability of different types of control signaling, thereby improving transmission resource use efficiency.

Figure 9:
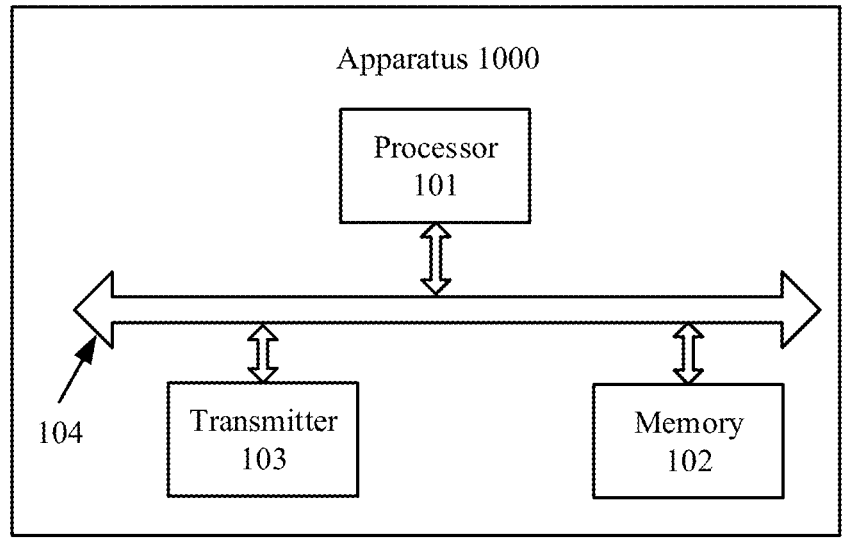
FIG. 9 is a schematic block diagram of a control signaling transmission apparatus according to still another embodiment of the present disclosure.

As shown in FIG. 9, an embodiment of the present disclosure provides a control signaling transmission apparatus 1000. The apparatus 1000 includes a processor 101, a memory 102, a transmitter 103, and a bus system 104. The bus system 104 is optional. The processor 101, the memory 102, and the transmitter 103 are connected using the bus system 104. The memory 102 is configured to store an instruction. The processor 101 is configured to execute the instruction stored by the memory 102, so as to control the transmitter 103 to transmit a signal. The processor 101 is configured to carry to-be-transmitted control signaling using a control channel. The control signaling carried on the control channel can indicate operation of at least two terminal devices. The transmitter 103 is configured to transmit the to-be-transmitted control signaling on the control channel.

Therefore, according to the control signaling transmission apparatus in this embodiment of the present disclosure, common control signaling that can indicate operation of multiple terminal devices and user dedicated control signaling that can indicate an operation behavior of only one terminal device are carried on different physical channels for transmission. In this way, different resource mapping manners and different signal processing manners can be used according to different transmission requirements, so as to optimally balance resource overheads and transmission reliability of different types of control signaling, thereby improving transmission resource use efficiency.

It should be understood that in this embodiment of the present disclosure, the processor 101 may be a central processing unit (CPU), or the processor 101 may be another general-purpose processor, a digital signal processor (DSP), an application-specific integrated circuit (ASIC), a field programmable gate array (FPGA) or another programmable logical device, a discrete gate or transistor logical device, a discrete hardware component, or the like. The general-purpose processor may be a microprocessor, or the processor may be any conventional processor or the like.

The memory 102 may include a read-only memory and a random access memory and provide an instruction and data for the processor 101. A part of the memory 102 may further include a non-volatile random access memory. For example, the memory 102 may further store information about a device type.

In addition to including a data bus, the bus system 104 may further include a power bus, a control bus, a status signal bus, or the like. However, for clear description, all kinds of buses are marked as the bus system 104 in the figure.

In an implementation process, all steps of the foregoing method may be completed using an integrated logic circuit of hardware in the processor 101 or using an instruction in a software form. The steps of the method disclosed with reference to the embodiments of the present disclosure may be executed and completed by a hardware processor, or may be executed and completed using a combination of hardware and software modules in the processor. The software module may be located in a storage medium mature in the art such as a random access memory, a flash memory, a read-only memory, a programmable read-only memory, an electrically erasable programmable memory, or a register. The storage medium is located in the memory 102. The processor 101 reads the information in the memory 102, and completes the steps of the foregoing method with reference to hardware of the processor 101. To avoid repetition, details are not repeated herein.

Optionally, in an embodiment, the control signaling carried on the control channel can be used to indicate a time-frequency resource location and/or a transmission format of control information that can be read by the at least two terminal devices.

Optionally, in an embodiment, the to-be-transmitted control signaling is control signaling scrambled using one or more of the following identifiers that can be used by the at least two terminal devices: a system information-radio network temporary identifier SI-RNTI, a random access-radio network temporary identifier RA-RNTI, or a paging-radio network temporary identifier P-RNTI.

Optionally, in an embodiment, the transmitter 103 is specifically configured to transmit the to-be-transmitted control signaling using at least one control channel element CCE on the control channel.

Optionally, in an embodiment, the control channel occupies M subcarriers in a system bandwidth in a frequency domain, and M is any positive integer less than a total quantity of subcarriers included by the system bandwidth.

Optionally, in an embodiment, the M subcarriers are located in the middle of the system bandwidth.

Optionally, in an embodiment, a value of M is 72.

Optionally, in an embodiment, the control channel and at least one of a data channel or a user dedicated control channel occupy a frequency domain resource using frequency division multiplexing.

Optionally, in an embodiment, the control channel occupies N symbols of one subframe in a time domain, and N is any positive integer less than a total quantity of symbols included by the subframe.

Optionally, in an embodiment, a time-frequency resource corresponding to the M subcarriers and the N symbols in the subframe includes T time-frequency resource subsets, and when the at least one CCE includes multiple CCEs, at least two of the multiple CCEs occupy different time-frequency resource subsets of the T time-frequency resource subsets, where M and N are positive integers greater than or equal to 1, and T is a positive integer greater than or equal to 2.

Optionally, in an embodiment, a time-frequency resource corresponding to the M subcarriers and the N symbols in the subframe includes T time-frequency resource subsets, and the at least one CCE occupies a same time-frequency resource subset in the T time-frequency resource subsets, where M, N, and T are positive integers greater than or equal to 1.

Optionally, in an embodiment, a precoding scheme used for the control channel is different from a precoding scheme used for the data channel.

Optionally, in an embodiment, a precoding scheme used for the control channel is different from a precoding scheme used for the user dedicated control channel.

Optionally, in an embodiment, transmit power allocation for the control channel is prior to transmit power allocation for the data channel.

Optionally, in an embodiment, transmit power allocation for the control channel is prior to transmit power allocation for the user dedicated control channel.

Optionally, in an embodiment, the apparatus is a network device.

In this embodiment of the present disclosure, optionally, a cell-specific reference signal may occupy a same frequency band as the control channel, and does not need occupy the entire system bandwidth. That is, the control channel further carries a cell-specific reference signal.

In this embodiment of the present disclosure, optionally, the M subcarriers are distributed discretely or distributed centrally in the system bandwidth. The distribution manner for the M subcarriers may change dynamically.

In this embodiment of the present disclosure, optionally, parameters of the control channel are preset, and these parameters of the control channel include one or more of: a quantity M of subcarriers occupied by the control channel, a quantity of selected antenna ports on the control channel that are used for transmission, pilot information, a time-frequency resource quantity, a time-frequency resource mapping manner of the control channel, a period, a subframe number, a timeslot number, a subcarrier number, a frequency band number, or power information.

Optionally, in an embodiment, when the selected M subcarriers cannot carry all of the common control signaling, other M0 subcarriers are selected as a second control channel. The processor 101 is configured to carry the to-be-transmitted control signaling using the selected M subcarriers and M0 subcarriers. The transmitter 103 transmits the to-be-transmitted control signaling. The M subcarriers may carry a part of the common control signaling and resource parameters of the second control channel (including one or more of parameters such as a value of M0, a quantity of selected antenna ports used for transmission on the second control channel, pilot information, a time-frequency resource quantity, a time-frequency resource mapping manner of the second control channel, a period, a subframe number, a timeslot number, a subcarrier number, a frequency band number, and power information). That is, the processor 101 carries the resource parameters of the second control channel using the M subcarriers, and the transmitter 103 transmits the resource parameters. It can be learnt from FIG. 4a that the value of M0 may change dynamically. Both a transmit density and period of the M0 subcarriers may be different from those of the M subcarriers. This can effectively control system overheads. The M0 subcarriers of the second control channel and the M subcarriers may be or may not be adjacent in a frequency domain, and may be the same or different in a time domain.

It should be understood that the apparatus 1000 in this embodiment of the present disclosure may correspond to the apparatus 10 in the foregoing embodiment of the present disclosure and may correspond to an execution body of the method in the foregoing embodiment of the present disclosure. In addition, the foregoing and other operations and/or functions of all modules of the apparatus 1000 are separately used to implement corresponding procedures of the method in FIG. 1. For simplicity, details are not repeated herein.

Therefore, according to the control signaling transmission apparatus in this embodiment of the present disclosure, common control signaling that can indicate operation of multiple terminal devices and user dedicated control signaling that can indicate an operation behavior of only one terminal device are carried on different physical channels for transmission. In this way, different resource mapping manners and different signal processing manners can be used according to different transmission requirements, so as to optimally balance resource overheads and transmission reliability of different types of control signaling, thereby improving transmission resource use efficiency.

Figure 10:
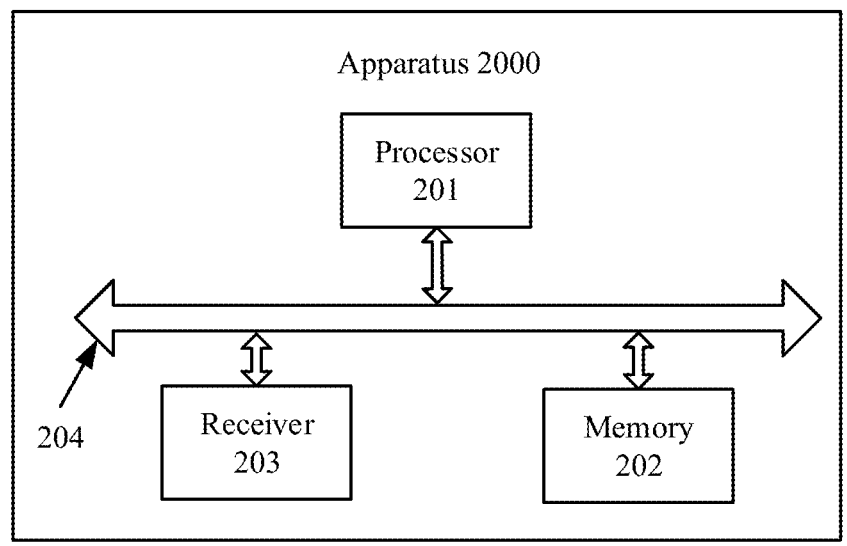
FIG. 10 is a schematic block diagram of a control signaling transmission apparatus according to yet another embodiment of the present disclosure.

As shown in FIG. 10, an embodiment of the present disclosure provides a control signaling transmission apparatus 2000. The apparatus 2000 includes a processor 201, a memory 202, a receiver 203, and a bus system 204. The bus system 204 is optional. The processor 201, the memory 202, and the receiver 203 are connected using the bus system 204. The memory 202 is configured to store an instruction. The processor 201 is configured to execute the instruction stored by the memory 202, so as to control the receiver 203 to receive a signal. The receiver 203 is configured to receive to-be-received control signaling using a control channel. The control signaling carried on the control channel can indicate operation of at least two terminal devices. The processor 201 is configured to demodulate the to-be-received control signaling.

Therefore, according to the control signaling transmission apparatus in this embodiment of the present disclosure, received common control signaling that can indicate operation of multiple terminal devices and received user dedicated control signaling that can indicate an operation behavior of only one terminal device are carried on different physical channels. In this case, in a communication process, a network device can use different resource mapping manners and different signal processing manners according to different transmission requirements, so as to optimally balance resource overheads and transmission reliability of different types of control signaling, thereby improving transmission resource use efficiency.

It should be understood that in this embodiment of the present disclosure, the processor 201 may be a central processing unit (CPU), or the processor 201 may be another general-purpose processor, a digital signal processor (DSP), an application-specific integrated circuit (ASIC), a field programmable gate array (FPGA) or another programmable logical device, a discrete gate or transistor logical device, a discrete hardware component, or the like. The general-purpose processor may be a microprocessor, or the processor may be any conventional processor or the like.

The memory 202 may include a read-only memory and a random access memory and provide an instruction and data for the processor 201. A part of the memory 202 may further include a non-volatile random access memory. For example, the memory 202 may further store information about a device type.

In addition to including a data bus, the bus system 204 may further include a power bus, a control bus, a status signal bus, or the like. However, for clear description, all kinds of buses are marked as the bus system 204 in the figure.

In an implementation process, all steps of the foregoing method may be completed using an integrated logic circuit of hardware in the processor 201 or using an instruction in a software form. The steps of the method disclosed with reference to the embodiments of the present disclosure may be executed and completed by a hardware processor, or may be executed and completed using a combination of hardware and software modules in the processor. The software module may be located in a storage medium mature in the art such as a random access memory, a flash memory, a read-only memory, a programmable read-only memory, an electrically erasable programmable memory, or a register. The storage medium is located in the memory 202. The processor 201 reads the information in the memory 202, and completes the steps of the foregoing method with reference to hardware of the processor 201. To avoid repetition, details are not repeated herein.

Optionally, in an embodiment, the control signaling carried on the control channel can be used to indicate a time-frequency resource location and/or a transmission format of control information that can be read by the at least two terminal devices.

Optionally, in an embodiment, the to-be-received control signaling is control signaling scrambled using one or more of the following identifiers that can be used by the at least two terminal devices: a system information-radio network temporary identifier SI-RNTI, a random access-radio network temporary identifier RA-RNTI, or a paging-radio network temporary identifier P-RNTI.

Optionally, in an embodiment, the receiver 203 is specifically configured to: transmit the to-be-received control signaling using at least one control channel element CCE on the control channel.

Optionally, in an embodiment, the control channel occupies M subcarriers in a system bandwidth in a frequency domain, and M is any positive integer less than a total quantity of subcarriers included by the system bandwidth.

Optionally, in an embodiment, the M subcarriers are located in the middle of the system bandwidth.

Optionally, in an embodiment, a value of M is 72.

Optionally, in an embodiment, the control channel and at least one of a data channel or a user dedicated control channel occupy a frequency domain resource using frequency division multiplexing.

Optionally, in an embodiment, the control channel occupies N symbols of one subframe in a time domain, and N is any positive integer less than a total quantity of symbols included by the subframe.

Optionally, in an embodiment, a time-frequency resource corresponding to the M subcarriers and the N symbols in the subframe includes T time-frequency resource subsets, and when the at least one CCE includes multiple CCEs, at least two of the multiple CCEs occupy different time-frequency resource subsets of the T time-frequency resource subsets, where M and N are positive integers greater than or equal to 1, and T is a positive integer greater than or equal to 2.

Optionally, in an embodiment, a time-frequency resource corresponding to the M subcarriers and the N symbols in the subframe includes T time-frequency resource subsets, and the at least one CCE occupies a same time-frequency resource subset in the T time-frequency resource subsets, where M, N, and T are positive integers greater than or equal to 1.

Optionally, in an embodiment, a precoding scheme used for the control channel is different from a precoding scheme used for the data channel.

Optionally, in an embodiment, a precoding scheme used for the control channel is different from a precoding scheme used for the user dedicated control channel.

Optionally, in an embodiment, transmit power allocation for the control channel is prior to transmit power allocation for the data channel.

Optionally, in an embodiment, transmit power allocation for the control channel is prior to transmit power allocation for the user dedicated control channel.

Optionally, in an embodiment, the apparatus is a terminal device.

In this embodiment of the present disclosure, optionally, a cell-specific reference signal may occupy a same frequency band as the control channel, and does not need occupy the entire system bandwidth. That is, the control channel further carries a cell-specific reference signal.

In this embodiment of the present disclosure, optionally, the M subcarriers are distributed discretely or distributed centrally in the system bandwidth. The distribution manner for the M subcarriers may change dynamically.

In this embodiment of the present disclosure, optionally, parameters of the control channel are preset, and these parameters of the control channel include one or more of: a quantity M of subcarriers occupied by the control channel, a quantity of selected antenna ports on the control channel that are used for transmission, pilot information, a time-frequency resource quantity, a time-frequency resource mapping manner of the control channel, a period, a subframe number, a timeslot number, a subcarrier number, a frequency band number, or power information.

Optionally, in an embodiment, when the selected M subcarriers cannot carry all of the common control signaling, other M0 subcarriers are selected as a second control channel. The receiver 203 is configured to receive the common control signaling on the M subcarriers and the M0 subcarriers. The M subcarriers may carry a part of the common control signaling and resource parameters of the second control channel (including one or more of parameters such as a value of M0, a quantity of selected antenna ports used for transmission on the second control channel, pilot information, a time-frequency resource quantity, a time-frequency resource mapping manner of the second control channel, a period, a subframe number, a timeslot number, a subcarrier number, a frequency band number, and power information). The receiver 203 is further configured to receive the resource parameters of the second control channel on the M subcarriers. It can be learnt from FIG. 4a that the value of M0 may change dynamically. Both a transmit density and period of the M0 subcarriers may be different from those of the M subcarriers. This can effectively control system overheads. The M0 subcarriers of the second control channel and the M subcarriers may be or may not be adjacent in a frequency domain, and may be the same or different in a time domain.

It should be understood that the apparatus 2000 in this embodiment of the present disclosure may correspond to the apparatus 20 in the foregoing embodiment of the present disclosure and may correspond to an execution body of the method in the foregoing embodiment of the present disclosure. In addition, the foregoing and other operations and/or functions of all modules of the apparatus 2000 are separately used to implement corresponding procedures of the method in FIG. 6. For simplicity, details are not repeated herein.

Therefore, according to the control signaling transmission apparatus in this embodiment of the present disclosure, received common control signaling that can indicate operation of multiple terminal devices and received user dedicated control signaling that can indicate an operation behavior of only one terminal device are carried on different physical channels. In this case, in a communication process, a network device can use different resource mapping manners and different signal processing manners according to different transmission requirements, so as to optimally balance resource overheads and transmission reliability of different types of control signaling, thereby improving transmission resource use efficiency.

In the foregoing embodiment, for example, the embodiment corresponding to FIG. 5, descriptions are provided using an example in which four antenna ports (that is, antenna ports #0 to #3) are selected from all antenna ports of a base station to transmit, in a narrow frequency band using a wide beam, common control signaling for indicating multiple terminal devices. In an actual application, the antenna ports may be not limited to four antenna ports. For example, the base station includes Q antenna ports, and P antenna ports can be selected from the Q antenna ports. Both P and Q are positive integers, and P is less than Q. After selecting the P antenna ports, in an implicit manner or in a partially-explicit and partially-implicit manner, the base station may transmit one or more pieces of information such as a value of P, information about a time-frequency resource occupied by a control channel, and pilot information to a terminal device that is in a coverage area of the base station.

(1) In the implicit manner, the base station and the terminal device jointly maintain a prescribed value of P, a prescribed time-frequency resource occupied by a control channel, and a prescribed mapping manner. That is, the base station transmits common control signaling in the foregoing resource-prescribed manner in a prescribed time and in a prescribed frequency band using a prescribed quantity of antenna ports. In this case, no extra resource is used for transmitting the control signaling. In other words, all parameters of the control channel are preset, and these parameters of the control channel include one or more of: a quantity M of subcarriers occupied by the control channel, a quantity of selected antenna ports on the control channel that are used for transmission, pilot information, a time-frequency resource quantity, a time-frequency resource mapping manner of the control channel, a period, a subframe number, a timeslot number, a subcarrier number, a frequency band number, or power information.

(2) In the partially-implicit and partially-explicit manner, some information is explicitly notified, and other information is deduced using a prescribed rule.

For example, the base station and the terminal device prescribe a timeslot used for transmission on a control channel, keep a quantity P of antenna ports used for transmission on the control channel, and a granularity of an occupied time-frequency resource element unchanged, prescribe in advance pilot information and a rule for mapping the control channel onto a time-frequency resource, and change only a quantity of time-frequency resource elements. In this case, the base station only needs to broadcast the quantity of time-frequency resource elements.

Alternatively, the base station and the terminal device prescribe several modes, and jointly maintain one mode table. One or more of parameters such as a value of a quantity M of subcarriers occupied by a control channel, a value of a quantity P of selected antenna ports on the control channel that are used for transmission, pilot information, a time-frequency resource quantity, a time-frequency resource mapping manner, a period, a subframe number, a timeslot number, a subcarrier number, a frequency band number, and power information are specified in each mode. In this case, the base station only needs to find a corresponding index number in the mode table according to a selected resource, and broadcast the corresponding index number to the terminal device in the coverage area of the base station.

Alternatively, resource parameters of a control channel used for transmitting control signaling next time or next several times are specified in currently transmitted common control signaling. These resource parameters include one or more of parameters such as a quantity of subcarriers occupied by the control channel used for transmitting the control signaling next time or next several times, a quantity of selected antenna ports on the control channel that are used for transmission, pilot information, a time-frequency resource quantity, a time-frequency resource mapping manner of the control channel, a period, a subframe number, a timeslot number, a subcarrier number, a frequency band number, and power information.

Figure 4A:
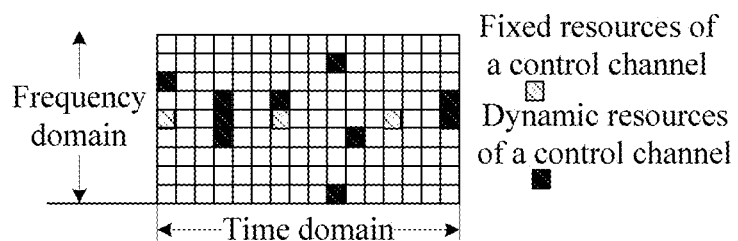
FIG. 4a is a schematic diagram of dynamically occupying a time-frequency resource by a control channel according to an embodiment of the present disclosure.

Alternatively, because time-frequency resources occupied by a control channel may be non-continuous in a frequency domain, common control signaling may be transmitted by dedicatedly using some time-frequency resources, for example, one or more time-frequency resource elements in a fixed time domain (transmission timeslot) and frequency domain (transmission frequency), a fixed quantity P of transmit antenna ports. The some time-frequency resources may be referred to as fixed resources. A manner of transmitting the common control signaling by the time-frequency resources is the same as that defined in the fully implicit manner. These resources do not change with factors such as a quantity of terminal devices, a capacity of a terminal device, a load weight, and strength of interference, and include information about another resource occupied by the control channel, for example, one or more of parameters such as information about another time-frequency resource in a current timeslot, a quantity P0 of selected antenna ports on another control channel that are used for transmission, a power, and pilot information, or include an index number determined in a prescribed mode. Similarly, in this manner, control information of a control channel for transmission next time or next several times may be specified. These parameters may change dynamically with factors such as a quantity of users, a user capacity, a load weight, and strength of interference, and therefore, resources may be defined as dynamic resources. The control channel mapped to these resources is equivalent to the second control channel in the foregoing embodiments. The P antenna ports used for transmission on the control channel corresponding to the fixed resources and the P0 antenna ports used for transmission on the control channel corresponding to the dynamic resources are independently selected. That is, an antenna array consisting of the P0 antenna ports may be a subset of an antenna array consisting of the P antenna ports, or an antenna array consisting of the P antenna ports may be a subset of an antenna array consisting of the P0 antenna ports, or the two antenna ports are the same, or there may be an intersection set or no intersection set between the two antenna ports. However, generally, a solution in which the two antenna ports are the same is used preferably. That is, one antenna array is used to transmit the control channels corresponding to the fixed resources and the dynamic resources. When a terminal device is to be connected, these fixed resources further need to include a cell access response or other information related to access control. FIG. 4a is a schematic diagram of this manner. Each blank space is a time-frequency resource element. As shown in FIG. 4a, when a value of M is preset by a system and M subcarriers cannot carry all of the common control signaling, other M0 subcarriers may be selected as dynamic resources. In this way, the M subcarriers (that is, the fixed resource on the control channel in FIG. 4a) carry a part of the common control signaling and resource parameters (including one or more of parameters such as a value of M0, a value of a quantity P0 of selected antenna ports used for transmitting control signaling on the dynamic resource, pilot information, time-frequency resource mapping of the dynamic resource, a transmission timeslot, a period, and a power). The dynamic resource carries another part of the common control signaling. It can be learnt from FIG. 4a that the fixed resource on the control channel is transmitted in a fixed timeslot and in a fixed period using a fixed time-frequency resource element. Actually, when a mapping manner is determined, all parameters can change dynamically even in a fully-implicit manner, provided that change rules are the same on both a base station side and a terminal device side. Correspondingly, the value of M0 may change dynamically. Both a transmit density and period of the M0 subcarriers may be different from those of the M subcarriers. This can effectively control system overheads. The dynamic resource corresponding to the M0 subcarriers may be specified using the fixed resource, or may be optionally selected in an implicit way according to a predetermined rule, achieving more flexibility. It can be learnt from FIG. 4a that the dynamic resource may use a time-frequency resource element that is adjacent or not adjacent to the fixed resource in one timeslot, or may use a time-frequency resource element in a different timeslot. The M subcarriers are distributed discretely or distributed centrally in a system bandwidth. The distribution manner for the M subcarriers may change dynamically. Optionally, in an embodiment, a cell-specific reference signal may occupy a same frequency band as the control channel, and does not need occupy the entire system bandwidth. That is, the control channel may further carry the cell-specific reference signal.

The processing module of the apparatus 10 or the processor of the apparatus 1000 in the foregoing embodiments may be further configured to select one or more antenna ports. For example, a base station includes Q antenna ports, and the processing module may be further configured to select P antenna ports from the Q antenna ports to transmit the control signaling, where both P and Q are positive integers, and P<Q. For example, in an example shown in FIG. 5, P=4.

It should be understood that "one embodiment" or "an embodiment" mentioned throughout the specification indicates that a particular characteristic, structure or property that is related to the embodiment is included in at least one embodiment of the present disclosure. Therefore, "in one embodiment" or "in an embodiment" that appears throughput the entire specification does not necessarily mean a same embodiment. Moreover, the particular characteristic, structure or property may be combined in one or more embodiments in any proper manner.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should further be understood that determining B according to A does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether these functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not repeated herein.

In the several embodiments provided in this application, it should be understood that the disclosed system, apparatus, and method may be implemented in other manners. For example, the described apparatus embodiment is only an example. For example, the unit division is only logical function division and may be other division in actual implementation. For example, multiple units or components may be combined or integrated into another system, or some features may be ignored or not performed. In addition, the displayed or discussed mutual couplings or direct couplings or communication connections may be indirect couplings or communication connections through some interfaces, apparatuses, or units in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are only specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A control signaling transmission method, comprising:
receiving, by a terminal device, to-be-received control signaling using at least one control channel element on a control channel, wherein the control signaling carried on the control channel is common control information that indicates operation of at least two terminal devices and is carried on a different physical channel than dedicated control signaling indicating operation of the terminal device, and wherein the control signaling carried on the control channel indicates a time-frequency resource location, a transmission format, or a combination thereof of control information to be read by the at least two terminal devices; and
demodulating the to-be-received control signaling;
wherein the control channel occupies M subcarriers in a system bandwidth in a frequency domain, and M is a positive integer less than a total quantity of subcarriers comprised by the system bandwidth.

2. The method according to claim 1, wherein the M subcarriers are located in a middle of the system bandwidth.

3. The method according to claim 1, wherein a value of M is 72.

4. The method according to claim 1, wherein the control channel and at least one of a data channel or a user dedicated control channel occupy a frequency domain resource using frequency division multiplexing.

5. The method according to claim 1, wherein when the control channel alone cannot carry all the control signaling, the control signaling is carried on the control channel and another control channel, and the method further comprises: receiving the control signaling on the control channel and the another control channel.

6. The method according to claim 5, wherein the control channel is further configured to carry resource parameters of the another control channel, and the method further comprises: receiving the resource parameters of the another control channel on the control channel.

7. The method according to claim 6, wherein the resource parameters of the another control channel comprise one or more of the following parameters: a quantity of subcarriers occupied by the another control channel, a quantity of transmit antenna ports selected for the another control channel, pilot information of the another control channel, a quantity of time-frequency resources of the another control channel, a time-frequency resource mapping manner of the another control channel, a period of the another control channel, a subframe number of the another control channel, a timeslot number of the another control channel, a subcarrier number of the another control channel, a frequency band number of the another control channel, or power information of the another control channel.

8. The method according to claim 1, wherein the control channel further carries a cell-specific reference signal, and the method further comprises: receiving the cell-specific reference signal on the control channel.

9. The method according to claim 1, wherein parameters of the control channel are preset, and the parameters of the control channel comprise one or more of: a quantity of subcarriers occupied by the control channel, a quantity of selected antenna ports on the control channel that are used for transmission, pilot information, a time-frequency resource quantity, a time-frequency resource mapping manner of the control channel, a period, a subframe number, a timeslot number, a subcarrier number, a frequency band number, or power information.

10. A control signaling transmission apparatus, comprising:
a processor of a terminal device and a computer readable storage medium accessible to the processor, wherein the processor is configured to:
receive to-be-received control signaling using at least one control channel element on a control channel, wherein the control signaling carried on the control channel is common control information that indicates operation of at least two terminal devices and is carried on a different physical channel than dedicated control signaling indicating operation of the terminal device, and wherein the control signaling carried on the control channel indicates a time-frequency resource location, a transmission format, or a combination thereof of control information to be read by the at least two terminal devices; and
demodulate the to-be-received control signaling;
wherein the control channel occupies M subcarriers in a system bandwidth in a frequency domain, and M is a positive integer less than a total quantity of subcarriers comprised by the system bandwidth.

11. The apparatus according to claim 10, wherein the M subcarriers are located in a middle of the system bandwidth.

12. The apparatus according to claim 10, wherein a value of M is 72.

13. The apparatus according to claim 10, wherein the control channel and at least one of a data channel or a user dedicated control channel occupy a frequency domain resource using frequency division multiplexing.

14. The apparatus according to claim 10, wherein when the control channel alone cannot carry all the control signaling, the control signaling is carried on the control channel and another control channel, and the processor is configured to receive the control signaling on the control channel and the another control channel.

15. The apparatus according to claim 14, wherein the control channel carries resource parameters of the another control channel, and the processor is further configured to receive the resource parameters of the another control channel on the control channel.

16. The apparatus according to claim 15, wherein the resource parameters of the another control channel comprise one or more of the following parameters: a quantity of subcarriers occupied by the another control channel, a quantity of transmit antenna ports selected for the another control channel, pilot information of the another control channel, a quantity of time-frequency resources of the another control channel, a time-frequency resource mapping manner of the another control channel, a period of the another control channel, a subframe number of the another control channel, a timeslot number of the another control channel, a subcarrier number of the another control channel, a frequency band number of the another control channel, or power information of the another control channel.

17. The apparatus according to claim 10, wherein the control channel further carries a cell-specific reference signal, and the processor is further configured to receive the cell-specific reference signal on the control channel.

18. The apparatus according to claim 10, wherein parameters of the control channel are preset, and the parameters of the control channel comprise one or more of: a quantity of subcarriers occupied by the control channel, a quantity of selected antenna ports on the control channel that are used for transmission, pilot information, a time-frequency resource quantity, a time-frequency resource mapping manner of the control channel, a period, a subframe number, a timeslot number, a subcarrier number, a frequency band number, or power information.

19. The apparatus according to claim 10, wherein the apparatus is a terminal device.

20. A non-transitory computer readable storage medium storing instructions which, when executed by a control signaling transmission apparatus, causes the control signaling transmission apparatus to perform operations comprising:
  receiving, by a terminal device, to-be-received control signaling using at least one control channel element on a control channel, wherein the control signaling carried on the control channel is common control information that indicates operation of at least two terminal devices and is carried on a different physical channel than dedicated control signaling indicating operation of the terminal device, and wherein the control signaling carried on the control channel indicates a time-frequency resource location, a transmission format, or a combination thereof of control information to be read by the at least two terminal devices; and
  demodulating the to-be-received control signaling;
  wherein the control channel occupies M subcarriers in a system bandwidth in a frequency domain, and M is a positive integer less than a total quantity of subcarriers comprised by the system bandwidth.

* * * * *